US012640318B2

(12) United States Patent
Wang

(10) Patent No.: US 12,640,318 B2
(45) Date of Patent: May 26, 2026

(54) ELECTRONIC DEVICE

(71) Applicant: HONOR DEVICE CO., LTD.,
Shenzhen (CN)

(72) Inventor: Xuyang Wang, Shenzhen (CN)

(73) Assignee: HONOR DEVICE CO., LTD.,
Shenzhen (CN)

( * ) Notice: Subject to any disclaimer, the term of this
patent is extended or adjusted under 35
U.S.C. 154(b) by 274 days.

(21) Appl. No.: 18/285,797

(22) PCT Filed: Apr. 13, 2023

(86) PCT No.: PCT/CN2023/087990
§ 371 (c)(1),
(2) Date: Oct. 5, 2023

(87) PCT Pub. No.: WO2023/231594
PCT Pub. Date: Dec. 7, 2023

(65) Prior Publication Data
US 2024/0258047 A1 Aug. 1, 2024

(30) Foreign Application Priority Data
Jun. 2, 2022 (CN) .......................... 202210619011.2

(51) Int. Cl.
*H01H 13/10* (2006.01)
*H01H 13/20* (2006.01)
(Continued)

(52) U.S. Cl.
CPC ............ *H01H 13/10* (2013.01); *H01H 13/20*
(2013.01); *H04M 1/0249* (2013.01); *H04M*
*1/236* (2013.01)

(58) Field of Classification Search
CPC .. H01H 3/00; H01H 3/02; H01H 3/14; H01H
3/141; H01H 21/06; H01H 21/24;
(Continued)

(56) References Cited

U.S. PATENT DOCUMENTS 5,545,865 A * 8/1996 Gotou .................... H01H 13/14
200/341
9,455,102 B2 * 9/2016 Takahashi .............. H01H 13/06
(Continued)

FOREIGN PATENT DOCUMENTS

CN 207651389 U 7/2018
CN 109119269 A 1/2019
(Continued)

*Primary Examiner* — Anthony R Jimenez
(74) *Attorney, Agent, or Firm* — WOMBLE BOND
DICKINSON (US) LLP

(57) ABSTRACT

Embodiments of this application provide an electronic
device. A first terminal of the trigger member is connected
to the button, and a second terminal of the trigger member
has a first assembly part. A via hole that passes through the
outer wall and an inner wall of the middle frame is formed
at a bottom of the button slot. The trigger member passes
through the via hole and rotates in the via hole to a
pre-assembly position or an assembly position. When the
trigger member rotates in the via hole to the pre-assembly
position, the trigger member passes through the via hole.
When the trigger member rotates in the via hole to the
assembly position, the first assembly part abuts against the
inner wall of the middle frame.

17 Claims, 21 Drawing Sheets

(51) Int. Cl.

| | | |
|---|---|---|
| *H04M 1/02* | (2006.01) | |
| *H04M 1/23* | (2006.01) | |

(58) Field of Classification Search

CPC ............. H01H 21/86; H01H 2223/002; H01H 2223/07; H01H 2229/046; H01H 2229/064; H01H 2229/048; H01H 2237/004; H01H 2221/026; H01H 2221/03; H01H 2221/08; H01H 2221/016; H01H 2221/044; H01H 13/06; H01H 13/10; H01H 13/14; H01H 13/20; H01H 13/18; H01H 13/186; H01H 13/7065; H01H 13/85; H01H 13/04; H01H 13/36; H01H 2225/028; H01H 2231/022; H01H 3/12; H01H 3/32; H01H 3/54; H01H 9/22; H01H 9/24; H01H 13/00; H01H 13/02; H01H 13/12; H01H 13/50; H01H 13/52; H01H 2221/066; H05K 1/00; H05K 1/02; H05K 1/18; H05K 1/189; Y10T 29/49105; H04M 1/02; H04M 1/0249; H04M 1/236; H04M 1/23

USPC ......................................................... 200/341
See application file for complete search history.

(56) References Cited

U.S. PATENT DOCUMENTS

| | | | |
|---|---|---|---|
| 2012/0160640 A1 | 6/2012 | Aldana et al. |
| 2015/0279589 A1 | 10/2015 | Park |
| 2023/0028551 A1 | 1/2023 | Fan |

FOREIGN PATENT DOCUMENTS

| | | | |
|---|---|---|---|
| CN | 210378835 U | 4/2020 |
| CN | 112019673 A | 12/2020 |
| CN | 212163894 U | 12/2020 |
| CN | 113223884 A | 8/2021 |
| CN | 214586430 U | 11/2021 |
| CN | 113745026 A | 12/2021 |
| CN | 216119999 U | 3/2022 |
| CN | 216353879 U | 4/2022 |
| CN | 114694993 A | 7/2022 |

* cited by examiner

ELECTRONIC DEVICE

CROSS-REFERECNE TO RELATED APPLICATIONS

This application is a national stage of International Application No. PCT/CN2023/087990 filed on Apr. 13, 2023, which claims priority to Chinese Patent Application No. 202210619011.2 filed on Jun. 2, 2022. The disclosures of both of the aforementioned application are hereby incorporated by reference in their entireties.

TECHNICAL FIELD

This application relates to the field of electronic technologies, and in particular to an electronic device.

BACKGROUND

With the development of science and technology, an electronic device such as a mobile phone gradually gets thinner and lighter, to satisfy a pursuit of ultimate experience of the mobile phone by a person.

As the electronic device such as the mobile phone gradually get thinner and lighter, to meet design requirements of the mobile phone for waterproof performance, reliability, hand feeling of a button, space of a radiator, and the like, more challenges are posed to designs of a button assembly and a middle frame of the mobile phone. Currently, a button slot is disposed on the middle frame of the mobile phone, the button assembly is assembled in the button slot and abuts against a conductive member on a button circuit board in the mobile phone. Therefore, when the button assembly is pressed, the conductive member may be elastically deformed, to trigger the button circuit board and enable functions of a button of the mobile phone.

However, how to simplify the button assembly and the assembly of the button assembly in the middle frame, and enable the electronic device to get thinner and lighter becomes an urgent technical problem that needs to be resolved.

SUMMARY

This application provides an electronic device, to simplify structures of a button assembly and a middle frame in the electronic device, to help the electronic device gets thinner and lighter.

An embodiment of this application provides an electronic device. The electronic device includes:

a button assembly, including a button and a trigger member;

a middle frame, where a button slot is disposed on an outer wall of the middle frame, and the button is disposed in the button slot, where a via hole that passes through the outer wall and an inner wall of the middle frame is formed at a bottom of the button slot;

the trigger member passes through the via hole, a first terminal of the trigger member is connected to the button, and a second terminal of the trigger member has a first assembly part;

the trigger member rotates in the via hole to a pre-assembly position or an assembly position, when the trigger member rotates in the via hole to the pre-assembly position, the trigger member passes through the via hole, or when the trigger member rotates in the via hole to the assembly position, the first assembly part abuts against the inner wall of the middle frame, to limit the trigger member to move toward the outer wall of the middle frame; and the button is configured to drive the trigger member to move toward a direction facing the inner wall of the middle frame, to trigger a conductive member in the electronic device.

According to the electronic device in this embodiment of this application, first, due to disposing of the button slot on the middle frame and disposing of the via hole at the bottom of the button slot, the button assembly may be easily assembled on the middle frame; second, due to disposing of the trigger member in the button assembly, the first terminal of the trigger member is connected to the button, the first assembly part is disposed on the second terminal of the trigger member, and the trigger member passes through the via hole and rotates in the via hole to the pre-assembly position or the assembly position. When the trigger member rotates to the pre-assembly position, the trigger member passes through the via hole, or when the trigger member rotates to the assembly position, the first assembly part abuts against the inner wall of the middle frame, to limit the trigger member to move toward the outer wall of the middle frame. In this way, the first assembly part abuts against the inner wall of the middle frame through rotation, and the button assembly is locked on the middle frame at the assembly position, to simplify the assembly of the button assembly on the middle frame, limit the trigger member to move toward the outer wall of the middle frame, and prevent the button assembly from falling out of the middle frame. In addition, openings on the middle frame may be reduced. This simplifies structures of the middle frame and the button assembly, and increases strength of the middle frame and a width of adhering the middle frame to another structural component in the electronic device such as a battery cover, to miniaturize the button assembly. Therefore, in a thinner and lighter design, design requirements for waterproof performance, reliability, hand feeling of a button, space of a radiator, and the like of the electronic device are met, to enable the electronic device to get thinner and lighter. Finally, the button drives the trigger member to move toward the inner wall of the middle frame, to trigger the conductive member in the electronic device, and enable functions of the button of the button assembly in the electronic device.

In a possible implementation, the trigger member further includes a trigger body. The trigger body extends in a radial direction of the via hole. The trigger body has the second terminal. The first assembly part projects from a side wall of the trigger body. A shape of a cross section of the via hole matches a shape of the trigger body and a shape of the first assembly part. When the trigger member rotates in the via hole to the pre-assembly position, the trigger body and the first assembly part pass the via hole, or when the trigger member rotates in the via hole to the assembly position, the first assembly part abuts against the inner wall of the middle frame, to limit the trigger member to move toward the outer wall of the middle frame.

In this way, due to disposing of the trigger body, the first assembly part, and the via hole, the trigger member passes the via hole to assemble the button assembly on the middle frame through rotation. In addition, when the trigger member rotates in the via hole to the assembly position, the trigger member abuts against the inner wall of the middle frame through the first assembly part, and when the button assembly is assembled on the middle frame, the button assembly does not move toward the outer wall of the middle frame and prevent the button assembly from falling out of the middle frame.

In a possible implementation, the via hole includes a first through hole and a second through hole that are connected to each other. A shape of a cross section of the first through hole is adapted to the shape of the cross section of the trigger body, and a shape of a cross section of the second through hole is adapted to the shape of the cross section of the first assembly part.

In this way, the trigger body may be disposed in the first through hole and may rotate in the first through hole. When the trigger member rotates in the via hole to the pre-assembly position through the trigger body, the first assembly part is disposed opposite to the second through hole and passes the second through hole. When the trigger member rotates in the via hole to the assembly position, a position of the first assembly part is offset relative to the second through hole. Therefore, the first assembly part abuts against the inner wall of the middle frame.

In a possible implementation, the inner wall of the middle frame has a limiting part. The limiting part is disposed on a side of the via hole, and when the trigger member rotates in the via hole to the assembly position, the first assembly part abuts against the limiting part, to limit the trigger member to rotate.

In this way, due to disposing of the limiting part, the trigger member is limited, to prevent the trigger member from continuously rotating at the assembly position and prevent the button assembly from falling out of the middle frame.

In a possible implementation, the limiting part is a groove that is disposed on the middle frame and adapted to a structure of the first assembly part, and the groove is connected to a side wall of the via hole. When the trigger member rotates in the via hole to the assembly position, the first assembly part is disposed in the groove and abuts against at least a part of a wall of the groove.

In this way, due to disposing of the groove, the trigger member is limited. Therefore, when the button is pressed, the trigger member easily falls out from the middle frame and moves toward an inner part of the electronic device. This enables the functions of the button of the electronic device, simplifies the structure of the middle frame, reduces manu-facturing costs of the electronic device, and facilitates the thinner and lighter design of the electronic device.

In a possible implementation, the first assembly part is a boss on the trigger member, and the boss is a strip block whose end part extends along an axial direction perpendicu-lar to the via hole.

In this way, due to disposing of the boss, stability of a connection between the first assembly part and the middle frame is enhanced. This prevents the button assembly from falling out of the middle frame, and enhances stability of assembling the button assembly on the electronic device.

In a possible implementation, at least two first assembly parts are disposed on the trigger member, and the two the first assembly parts are spaced apart each other around the via hole. A quantity of limiting parts equals a quantity of first assembly parts, and the limiting parts are in a one-to-one correspondence with the first assembly parts.

In this way, due to disposing of the at least two first assembly parts, stability of a connection between the trigger member and the middle frame is further enhanced, and a better effect of preventing the button assembly from falling out of the middle frame is achieved.

In a possible implementation, when the trigger member rotates in the via hole to the assembly position, the first assembly part is engaged with the inner wall of the middle frame, and the first terminal is engaged with the button, to limit the trigger member and the button to move toward the outer wall of the middle frame.

In this way, because the first assembly part is engaged with the middle frame and the trigger member is engaged with the button, while the button assembly is assembled on the middle frame to prevent the button assembly from falling out of the middle frame, a process of assembling the button assembly in the middle frame is simplified. This reduces a reliability risk of the overall machine and the manufacturing costs in the thinner and lighter design of the electronic device, and ensures the hand feeling of the button of the electronic device.

In a possible implementation, the first terminal has a second assembly part, and the second assembly part is disposed in the button and engaged with the button, to limit the button to move toward the outer wall of the middle frame.

In this way, due to disposing of the second assembly part, while the trigger member is stably connected to the button to effectively prevent the button from moving toward the outer wall of the middle frame and falling out of the middle frame, the trigger member may be easily assembled and may easily rotate in the button, to assemble the button assembly in the middle frame.

In a possible implementation, the button has an assembly cavity and an assembly hole through which the second assembly part passes. The assembly hole is connected to the assembly cavity, and the second assembly part is disposed in the assembly cavity through the assembly hole and engaged with the button, to limit the button to move toward the outer wall of the middle frame. The first assembly part and the second assembly part are respectively disposed in different directions of the trigger member in a circumferential direc-tion.

In this way, due to disposing of the assembly cavity and the assembly hole, the second assembly part is assembled in the button. In addition, when the trigger member rotates in the via hole to the assembly position, the second assembly part is blocked in the button through a wall of the assembly cavity. Therefore, the trigger member passes the first assem-bly part and the second assembly part by one rotation, to connect the trigger member to the button and the middle frame.

In a possible implementation, when the trigger member rotates in the via hole to the assembly position, the second assembly part and the assembly hole are disposed in a staggered manner and engaged with a wall of the assembly cavity, to limit the button to move toward the outer wall of the middle frame.

When the trigger member rotates in the via hole to the pre-assembly position, the second assembly part is disposed opposite to the assembly hole, and the second assembly part passes the assembly hole.

In this way, when the trigger member rotates from the pre-assembly position to the assembly position through rotation, the trigger member is engaged with the button and the middle frame, to prevent the button assembly from moving toward the outer wall of the middle frame and prevent the button assembly from falling out of the middle frame. Alternatively, when the trigger member rotates from the assembly position to the pre-assembly position through rotation, the trigger member is quickly disassembled from the button and the middle frame.

In a possible implementation, a blocking part that extends toward a side of the assembly hole is disposed on the wall of the assembly cavity, and the blocking part is engaged with the second assembly part, to limit the button to move toward the outer wall of the middle frame.

In this way, due to disposing of the blocking part, the second assembly part is blocked in the button and engaged with the trigger member. This simplifies a structure of the button and reduces weights of the button assembly and the electronic device, to enable the electronic device to get thinner and lighter.

In a possible implementation, the second assembly part is disposed on an end surface of the first terminal, a rotating groove is formed on a circumferential surface of the trigger member, and at least a part of a structure of the blocking part is disposed in the rotating groove and is engaged with the second assembly part, to limit the button to move toward the outer wall of the middle frame.

In this way, due to a disposing position of the second assembly part on the trigger member and disposing of the rotating groove, while the trigger member is connected to the button, the trigger member is not reversely mounted on the button and the middle frame, to quickly assemble the button assembly on the middle frame, reduce a risk of assembling the button assembly on the electronic device, and ensures the hand feeling of the button.

In a possible implementation, the second assembly part is an assembly block on the end surface of the first terminal, and the assembly block is a strip block that extends along a length direction of the electronic device.

In this way, due to disposing of the assembly block, an engaging area between the second assembly part and the button is increased and stability of the connection between the trigger member and the button is ensured. In addition, an assembly position of the trigger member in the via hole is easily identified.

In a possible implementation, two first assembly parts are disposed on the trigger member, an extending direction of the second assembly part is perpendicular to a connection line between the two first assembly parts, or an extending direction of the second assembly part is in parallel to a connection line between the two first assembly parts.

In this way, at the assembly position, the trigger member is stably connected to the button and the middle frame, to prevent the button assembly from falling out of the middle frame. Therefore, while the structure of the button assembly is more diversified, a size of an opening on the middle frame is reduced, and the structure of the middle frame is simplified, to help the electronic device to get thinner and lighter.

In a possible implementation, a distance between the first assembly part and the second assembly part is greater than a bottom thickness of the button slot at a position corresponding to the first assembly part, to ensure that when the trigger member rotates in the via hole to the assembly position, the first assembly part is engaged with the inner wall of the middle frame.

In this way, due to disposing of the distance between the first assembly part and the second assembly part, when the trigger member rotates to the assembly position, the first assembly part is engaged with the inner wall of the middle frame. This simplifies an assembly of the button assembly on the middle frame, reduces an assembly risk of the button assembly, and ensures the hand feeling of the button of the electronic device, to achieve a purpose of preventing the button assembly from falling out of the middle frame.

In a possible implementation, a force application slot is formed on the trigger member, and the force application slot is disposed at the second terminal of the trigger member.

In this way, due to disposing of the force application slot, while the button assembly is assembled on the middle frame, an auxiliary tool may act in the force application slot, to drive the trigger member to rotate in the via hole relative to the middle frame and the button, thereby assembling the button assembly on the middle frame.

In a possible implementation, the button assembly further includes a buffer, the buffer is disposed in an assembly cavity of the button and connected between the trigger member and the button.

In this way, due to disposing of the buffer, pressing feeling of the electronic device at the button assembly is enhanced.

In a possible implementation, the middle frame has a middle plate and a border frame, the border frame encloses a circumferential edge of the middle plate, the button assembly is disposed on the border frame, and the button assembly includes at least one of a power button, a volume up button, and a volume down button.

In this way, due to disposing of the button assembly on the border frame, a structure of the border frame may be properly utilized, to enable the functions of the button of the electronic device. In addition, the button assembly includes the power button, the volume up button, and the volume down button. Therefore, efficiency of assembling the button assembly on the electronic device is improved and the manufacturing costs of the electronic device are reduced, and linkage between the volume up button and the volume down button is effectively avoided, to avoid a channeling problem of the button.

In a possible implementation, the electronic device further includes a button circuit board. The conductive member is disposed on the button circuit board, the conductive member is disposed in the middle frame and abuts against the second terminal, and the trigger member is configured to move toward the direction facing the inner wall of the middle frame under drive of the button, to trigger an elastic deformation of a side, facing the button circuit board, of the conductive member, and conduct the conductive member with the button circuit board.

In this way, because the trigger member abuts against the conductive member, when the button is pressed, the trigger member is driven to move toward the inner wall of the middle frame. Therefore, the conductive member is conducted by the second terminal of the trigger member, and the conductive member is elastically deformed toward a side of the button circuit board and conducted to the button circuit board. While the functions of the button of the electronic device are enabled, the trigger member and the button assembly are further fastened in the middle frame, to enhance stability of assembling the button assembly in the middle frame.

BRIEF DESCRIPTION OF REFERENCE NUMERALS OF THE ACCOMPANYING DRAWINGS

100: mobile phone; 10: display; 20: middle frame; 21: middle plate; 22: border frame; 221: left border frame; 222: top border frame; 223: right border frame; 2231: button slot; 2232: via hole; 2233: first through hole; 2234: second through hole; 2235: limiting part; 224: bottom border frame;

30: battery cover; 40: button assembly; 41: button; 411: assembly hole; 412: assembly cavity; 4121: blocking part; 4122: opening; 413: supporting part; 414: hanging platform;

42: trigger member; 421: trigger body; 4211: circumferential surface; 4212: connection part; 4213: rotating groove; 422: first assembly part; 423: second assembly part; 424: force application slot; 43: bolt; 44: engaging area; 45: buffer;

50: button circuit board; 51: conductive member.

DESCRIPTION OF EMBODIMENTS

Figure 1:
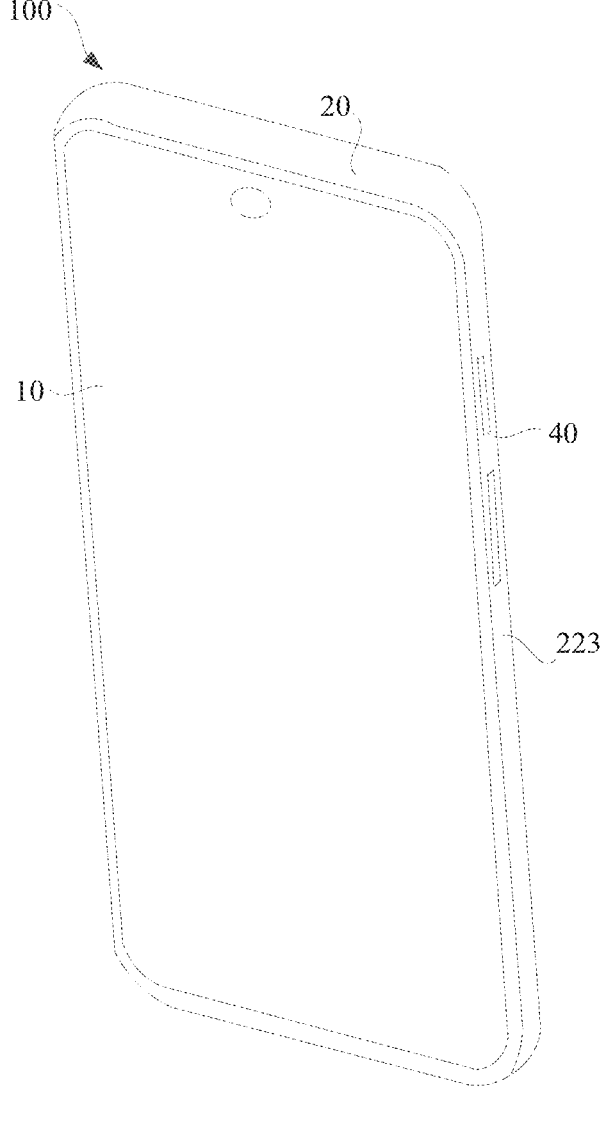
FIG. 1 is a schematic diagram of a structure of an electronic device according to an embodiment of this application.
Figure 2:
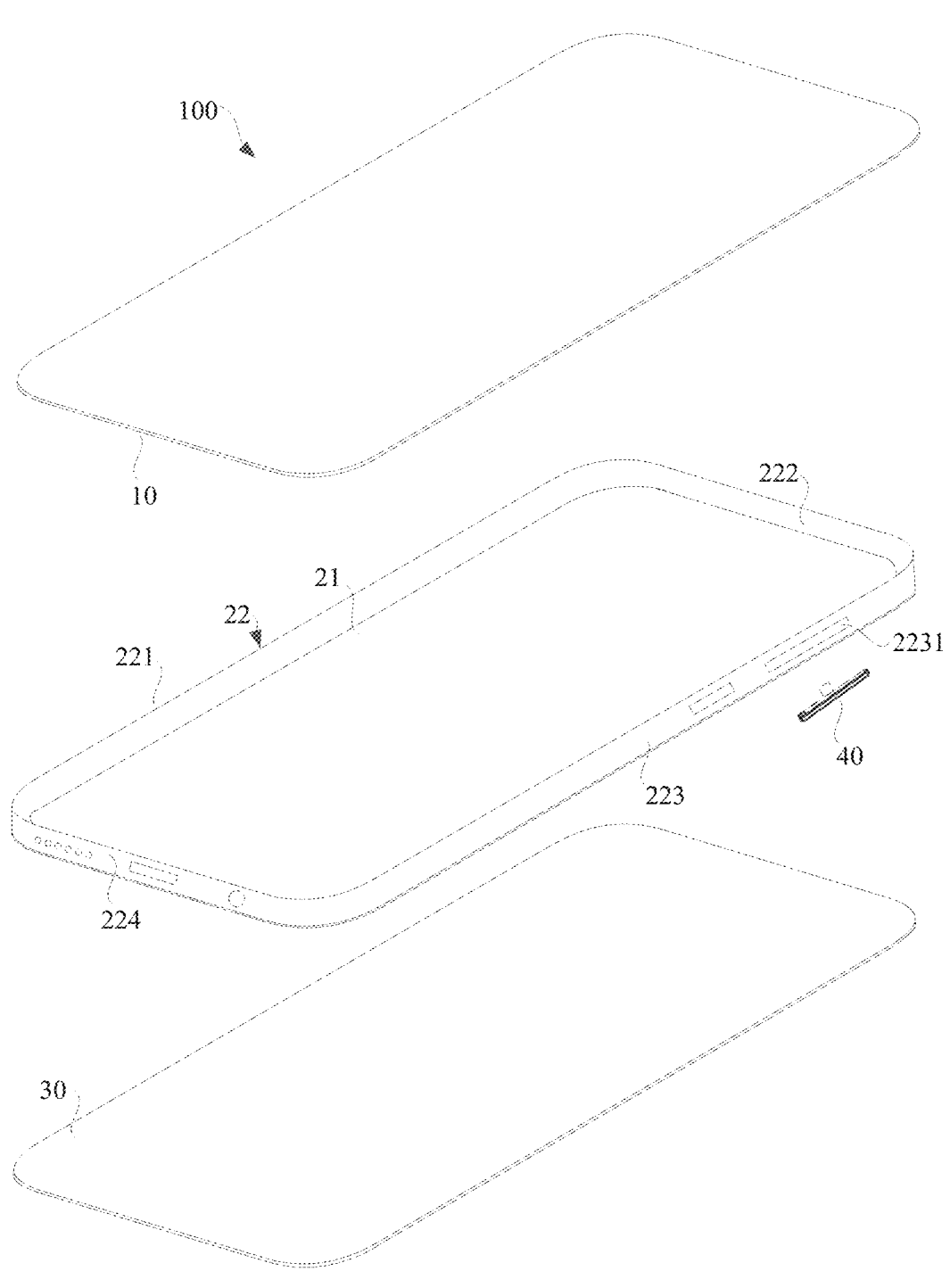
FIG. 2 is a split view of an electronic device according to an embodiment of this application.

FIG. 1 and FIG. 2 are an overall view and a split view of an electronic device.

As shown in FIG. 1 and FIG. 2, an embodiment of this application provides an electronic device. The electronic device includes a button assembly 40 and a middle frame 20. The button assembly 40 is disposed on an outer wall of the middle frame 20. The outer wall of the middle frame 20 may be understood as a side wall exposed on a surface of the electronic device, of the middle frame 20. For example, the button assembly 40 may include but is not limited to a power button and a volume button. Generally, as shown in FIG. 2, the middle frame 20 has a middle plate 21 and a border frame 22, the border frame 22 encloses a circumferential edge of the middle plate 21, to form the middle frame 20 with the middle plate 21. The button assembly 40 may be disposed on the border frame 22. The border frame 22 may include a left border frame 221, a top border frame 222, a right border frame 223, and a bottom border frame 224. The left border frame 221, the top border frame 222, the right border frame 223, and the bottom border frame 224 may be connected end-to-end to form an annular border frame 22.

Figure 3:
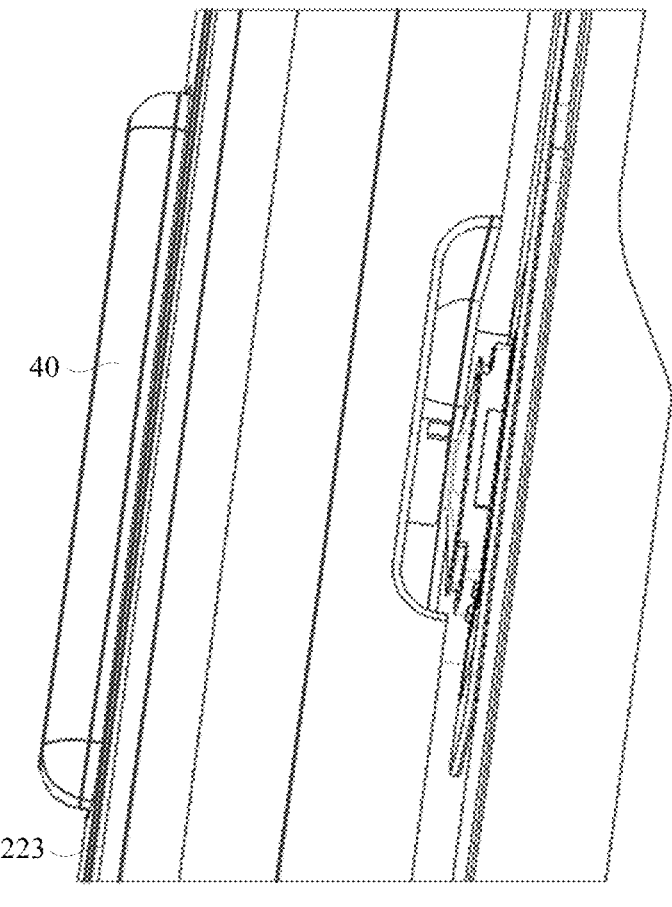
FIG. 3 is a schematic diagram of a partial assembly of a button assembly and a middle frame in an electronic device according to an embodiment of this application.

FIG. 3 is a schematic diagram of a partial assembly of a button assembly and a middle frame in an electronic device like a mobile phone.

As shown in FIG. 1 to FIG. 3, the button assembly 40 may be disposed on the right border frame 223. Alternatively, in some embodiments, the button assembly 40 may also be disposed at another position of the border frame 22, for example, the left border frame 221. In this way, due to disposing of the button assembly 40 on the border frame 22, the border frame 22 such as the right border frame 223 may be properly utilized. Therefore, while functions of the button of the electronic device are enabled, an operation habit of a user is better met.

In this embodiment, the electronic device may include but is not limited to any electronic device that has the middle frame 20 and needs the functions of the button, for example, a mobile phone 100, a tablet computer (that is, a pad), a notebook computer, an ultra-mobile personal computer (ultra-mobile personal computer, UMPC), a handheld computer, a walkie-talkie, a netbook, a POS machine, a personal digital assistant (personal digital assistant, PDA), a wearable device, or a virtual reality device.

The following further describes a structure of the electronic device in this embodiment by using an example in which the button assembly 40 is disposed on the right border frame 223 of the mobile phone 100.

As shown in FIG. 2, the electronic device such as the mobile phone 100 may also include a display 10 and a battery cover 30. The display 10 and the battery cover 30 are connected to two opposite surfaces of the middle frame 20. Generally, due to the display 10 and the battery cover 30, the middle frame 20 may be separately connected to the display 10 and the battery cover 30 in an adhering manner.

It should be noted that the structure shown in FIG. 2 in this embodiment does not constitute a limitation on the structure of the electronic device. The electronic device may also include another structure shown in FIG. 2, for example, a circuit board, a battery, and a camera. For a disposing manner of the circuit board, the battery, and the camera on the electronic device such as the mobile phone 100, refer to a disposing manner in the mobile phone 100 of the related technology. This is not specifically limited in this embodiment.

With a pursuit of ultimate experience of the electronic device such as the mobile phone 100 by the user, a thinner and lighter electronic device such as the mobile phone 100 has become a mainstream. The mobile phone 100 is used as an example. In a process of realizing a design of thinning and losing a weight of the electronic device, the button assembly 40 of the mobile phone 100 and the middle frame 20 at the button assembly 40 meet the following new challenges.

First, in terms of waterproof performance of the electronic device such as the mobile phone 100, currently, the battery cover 30 and the middle frame 20 are mainly adhered by brushing gum or dispensing adhesive, to achieve waterproof performance of the mobile phone 100 at a joint between the middle frame 20 and the battery cover 30. How to ensure an effective adhering width between the battery cover 30 and the middle frame 20 and how to close an adhering path are key points to achieve the waterproof performance. To enable the functions of the button of the mobile phone 100 and ensure reliability of button experience, auxiliary features such as a slot or a hole need to be processed at the middle frame 20 and the button assembly 40. Due to disposing of the auxiliary features, the adhering width between the battery cover 30 and the middle frame 20 is obviously reduced. This increases a risk that the whole mobile phone 100 fails due to ingress of liquid, and affects the waterproof performance of the electronic device such as the mobile phone 100.

Second, in terms of a wall thickness of the middle frame 20 (that is, a thickness of the border frame 22), an appearance effect of an industrial design (Industrial Design, ID) of the electronic device such as the mobile phone 100 is ensured, to reduce a weight of the mobile phone 100 and enable the mobile phone 100 to get thinner and lighter, the middle frame 20 is usually formed by processing various materials such as aluminum alloy and plastic. Based on different requirements for reducing the weight, a material for manufacturing the middle frame 20 may be continuously split based on the aluminum alloy and the plastic. Due to a large size of the button assembly 40, in the limit of the wall thickness of the middle frame 20, installation space occupied by the button assembly 40 on the middle frame 20 is large. This weakens strength of the middle frame 20 and increases a reliability risk of the whole electronic device such as the mobile phone 100. Especially for the mobile phone 100 with a special three-dimensional shape, the overall reliability risk is higher.

Then, in terms of hand feeling of the button of the electronic device such as the mobile phone 100, if a structure of the button assembly 40 is more complex, a risk of assembling the button assembly 40 on the middle frame 20 is higher, and the reliability risk of the whole electronic device is increased. This greatly affects the hand feeling of the button, and reduces a process success rate and an assemble success rate of the button assembly 40, resulting in an increase of manufacturing costs of the electronic device such as the mobile phone 100 to a specific extent. Therefore, in a thinner and lighter design of the mobile phone 100, there is a strong design demand for simplification in the structure and miniaturization in the size of the button assembly 40.

Finally, in terms of a design requirement for radiator space of the electronic device such as the mobile phone 100, a thickness and a size of the mobile phone 100 are reduced, insulation requirements for a radiator such as an antenna and a periphery of the radiator are changed accordingly. After the size of the button assembly 40 is miniaturized, the relatively thick wall of the middle frame 20 is ensured, to process insulation space on the border frame 22 based on a requirement for the antenna. Therefore, when the radiator space is designed, there is a same design requirement for miniaturization in the size of the button assembly 40.

Therefore, in the thinner and lighter design of the electronic device such as the mobile phone 100, the structure of the button assembly 40 needs to be simplified as much as possible, to enable the button assembly 40 to develop in a miniaturized structure, and meet design requirements for the wall thickness of the middle frame 20, the hand feeling of the button, and the radiator space in the thinner and lighter design of the electronic device. In addition, a quantity of openings in the middle frame 20 at the button assembly 40 needs to be reduced as much as possible, to meet a requirement for the waterproof performance in the thinner and lighter design of the electronic device, thereby enabling the electronic device such as the mobile phone 100 to get thinner and lighter.

Figure 4:
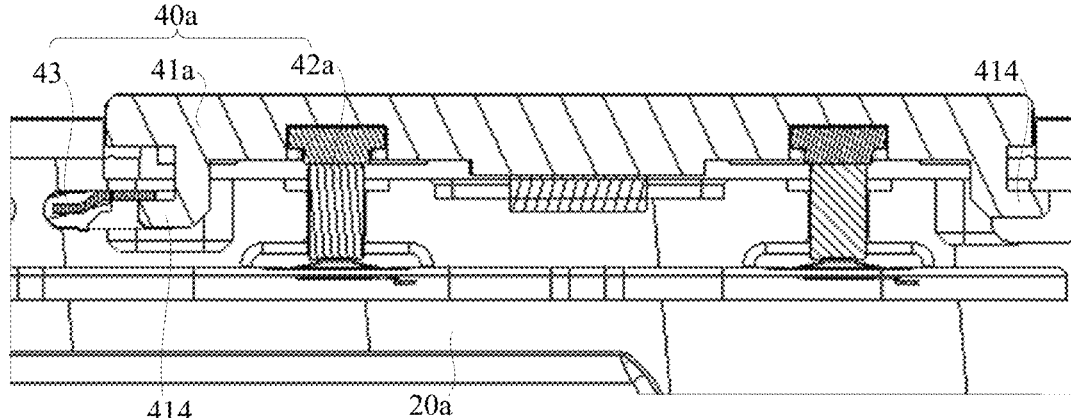
FIG. 4 is a schematic diagram of a partial assembly of a button assembly and a middle frame according to a related technology.

FIG. 4 is a schematic diagram of a partial assembly of a button assembly and a middle frame according to a related technology (that is, a related technology 1).

As shown in FIG. 4, in the related technology 1, a button assembly 40a includes a button 41a, a trigger member 42a, and a bolt 43. The button 41a is assembled in a button slot (not shown in the figure) on a middle frame 20a. The trigger member 42a is connected to a surface, facing an inner part of the middle frame 20a, of the button 41a, and assembled on the middle frame 20a via a through hole in the button slot. Two hanging platforms 414 are disposed on the button 41a along a length direction of a mobile phone 100. In a process of assembling the button 41a on the middle frame 20a, first, the button 41a needs to be tilted, to overlap one hanging perform 414 on the button 41a with the middle frame 20a and assemble the one hanging perform 414 in the middle frame 20a, the button 41a is pushed into the button slot, and finally the button 41a is pushed toward the inner part of the middle frame 20a. Therefore, the bolt 43 is assembled in the middle frame 20a through a bolt slot on the middle frame 20a in a thickness direction of the middle frame 20a (that is, a thickness direction of an electronic device), and overlapped with another hanging table 414 on the button 41a, to fasten the button 41a into the button slot of the middle frame 20a and prevent the button 41a from falling out of the middle frame 20a.

However, there are the following disadvantages in the related technology 1.

1. A complex structure of the button assembly 40a and a small structure size of the bolt 43 do not facilitate the assembly, easily resulting in a problem that the button assembly 40a is not assembled in place or not assembled in the middle frame 20a. Because the two hanging platforms 414 in the button 41a are asymmetrical in design, the button 41a is easily assembled on the middle frame 20a in a direction opposite to an assembly direction (that is, reverse assembly), causing hand feeling of the button becomes poor. In addition, when the button assembly 40a is a volume button that is integrated with a volume up button and a volume down button, because the two hanging platforms 414 on the button 41a are fastened in the middle frame 20a, when a user presses the button assembly 40a, there is a risk of linkage between the volume up button and the volume down button, and the hand feeling of the button is affected.

2. Because the two hanging platforms 414 of the button 41a and the bolt slot need to be separately processed and molded, the button slot and the bolt slot need to be opened on the middle frame 20a, opening positions of the button slot and the bolt slot are scattered, and the bolt slot is disposed in the thickness direction of the middle frame 20a, causing a relatively small effective adhering width between the middle frame 20a and a battery cover 30. Therefore, there is a high risk of ingress of liquid at an adhering part between the middle frame 20a and the battery cover 30 of the electronic device such as the mobile phone 100, and in a thinner and lighter design, requirements for waterproof performance of the electronic device are affected.

3. Due to disposing of the button slot, the through hole, and the bolt slot, machining of the middle frame 20a is complex, and machining costs of the middle frame 20a are high.

4. The bolt 43 is connected to the middle frame 20a by dispensing adhesive. Due to a complex structure of the bolt slot, when the adhesive is not dispensed in place around the bolt slot of the middle frame 20a, or when the bolt 43 is not matched in place with the middle frame 20a, the hand feeling of the button becomes poor.

Therefore, in the related technology 1, because the structure of the button assembly 40a is complex, the button assembly 40a is not easily assembled on the middle frame 20, the hand feeling of the button becomes poor, and a risk of linkage between the volume up button and the volume down button is easily generated. In addition, the risk of ingress of liquid at the adhering part between the middle frame 20a and the battery cover 30 is high.

For this reason, in the related technology 2, a steel sheet is disposed in the button assembly. The bolt 43 in the related technology 1 is replaced with the steel sheet, to fasten the button 41a in the middle frame. An assembly manner of the button assembly in the related technology 2 is not illustrated in the figure. The steel sheet is assembled in the middle frame through a steel sheet slot on the middle frame, and the steel sheet is adhered to the middle frame through a structural design on a surface of the steel sheet, for example, a bump or a groove, and the gum. Therefore, when being fastened on the middle frame, the steel sheet may be overlapped with the two hanging platforms 414 of the button 41a, to fasten the button 41a in the middle frame and prevent the button 41a and the trigger member 42a from falling out of the middle frame.

However, there are following disadvantages in the related technology 2.

1. A width and a length of the steel sheet determine a size of the steel sheet slot on the middle frame. If the hanging platforms 414 are disposed at two ends of the button 41a, the two hanging platforms 414 need to be fastened through the steel sheet. Therefore, the length of the steel sheet is related to layout and lengths of the hanging platforms 414 on the button 41a. If both the power button and the volume button need to be fastened through the steel sheet, the length of the steel sheet needs to be increased. An opening area of the middle frame in a thickness direction is positively correlated with an effective adhering area between the middle frame and the battery cover 30. Consequently, the effective adhering area between the middle frame and the battery cover 30 is relatively small, the risk of ingress of liquid at the adhering part between the middle frame and the battery cover 30 of the electronic device such as the mobile phone 100 is high, and in the thinner and lighter design, it is difficult to meet the requirements for waterproof performance of the electronic device such as the mobile phone 100.

2. In a process of assembling the button assembly on the middle frame, the steel sheet is easily deformed. Therefore, a fitting position of the hanging platform 414 and the steel sheet is changed, and the hand feeling of the button becomes poor.

3. When the button assembly is the volume button that is integrated with a volume up button and a volume down button, because the two hanging platforms 414 on the button are fastened in the middle frame through the steel sheet, when the user presses the button assembly, there is the risk of linkage between the volume up button and the volume down button, and the hand feeling of the button is affected.

4. Because the bump on the steel sheet is adhered to the middle frame with the gum, when the gum is improperly dispensed, the gum is easily activated in advance in a process of assembling the steel sheet in the middle frame. Therefore, the steel sheet is not assembled in place on the middle frame, fixation of the button on the middle frame is affected, the button easily falls out from the middle frame, or the hand feeling of the button becomes poor.

It can be learned that, although the bolt 43 in the button assembly 40a is not disposed in the solution 2, there is still a technical problem of poor hand feeling of the button and poor waterproof performance of the electronic device such as the mobile phone 100 in the thinner and lighter design.

In view of this, in this embodiment of this application, the electronic device provides a novel button assembly 40. The button assembly 40 has a simple and miniaturized structure. The structure of the middle frame 20 and the assembly of the button assembly 40 in the middle frame 20 may be simplified through the button assembly 40. Therefore, in the thinner and lighter design, design requirements for waterproof performance, reliability, the hand feeling of the button, space of a radiator, and the like of the electronic device can be met, to help the electronic device get thinner and lighter.

The following further describes structures of the button assembly and the electronic device in this application with reference to the accompanying drawings and embodiments.

Figure 5:
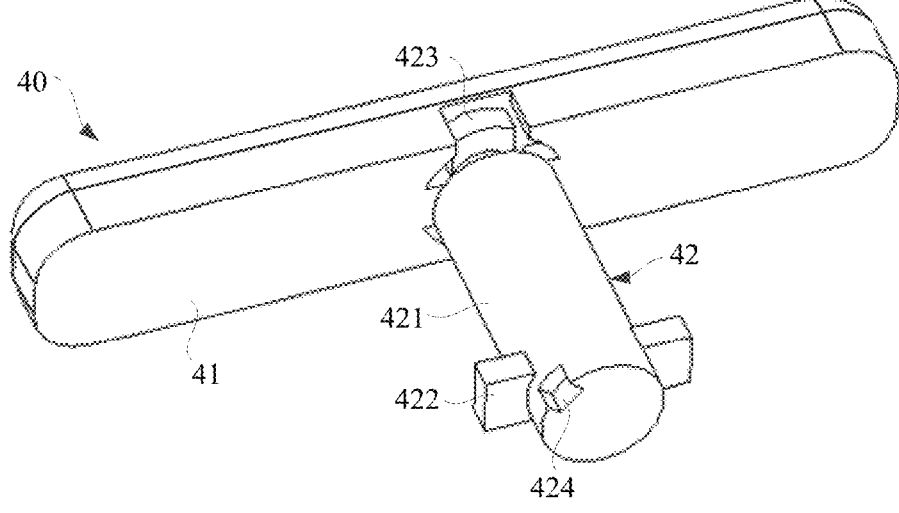
FIG. 5 is a schematic diagram 1 of a structure of a button assembly according to an embodiment of this application.
Figure 6:
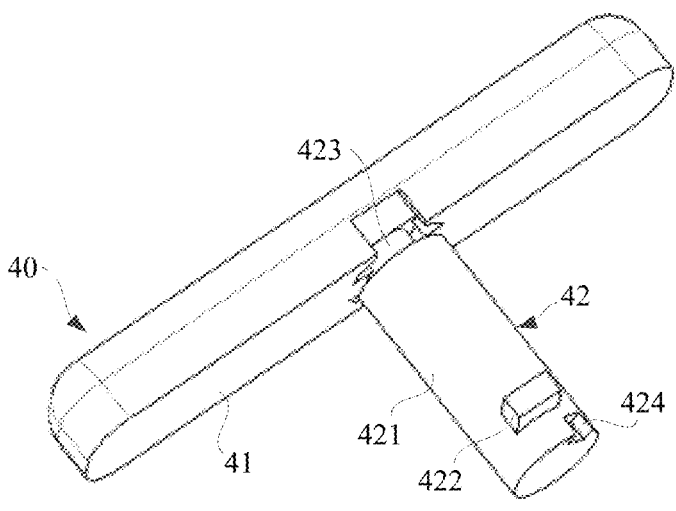
FIG. 6 is a schematic diagram 2 of a structure of a button assembly according to an embodiment of this application.

FIG. 5 and FIG. 6 are separate schematic diagrams of structures of a button assembly at different positions according to embodiments of this application.

As shown in FIG. 5 and FIG. 6, a button assembly 40 includes a button 41 and a trigger member 42. The button 41 may also be referred to as a button cap. The trigger member 42 may include but is not limited to a PIN, a columnar structure, or another structure capable of triggering functions of a button of an electronic device. A button slot 2231 (as shown in FIG. 2) is disposed on an outer wall of a middle frame 20, and the button 41 is disposed in the button slot 2231. To easily dispose the button 41 in the button slot 2231, a structure of the button slot 2231 is adapted to a structure of the button 41. The button slot 2231 may be disposed on an outer wall of a right border frame 223. The button 41 is embedded in the right border frame 223 through the button slot 2231 and exposed on a surface of the electronic device such as a mobile phone 100 (as shown in FIG. 2 and FIG. 3). This facilitates pressing by a user, to enable the functions of the button of the button assembly 40 on the electronic device.

Figure 7:
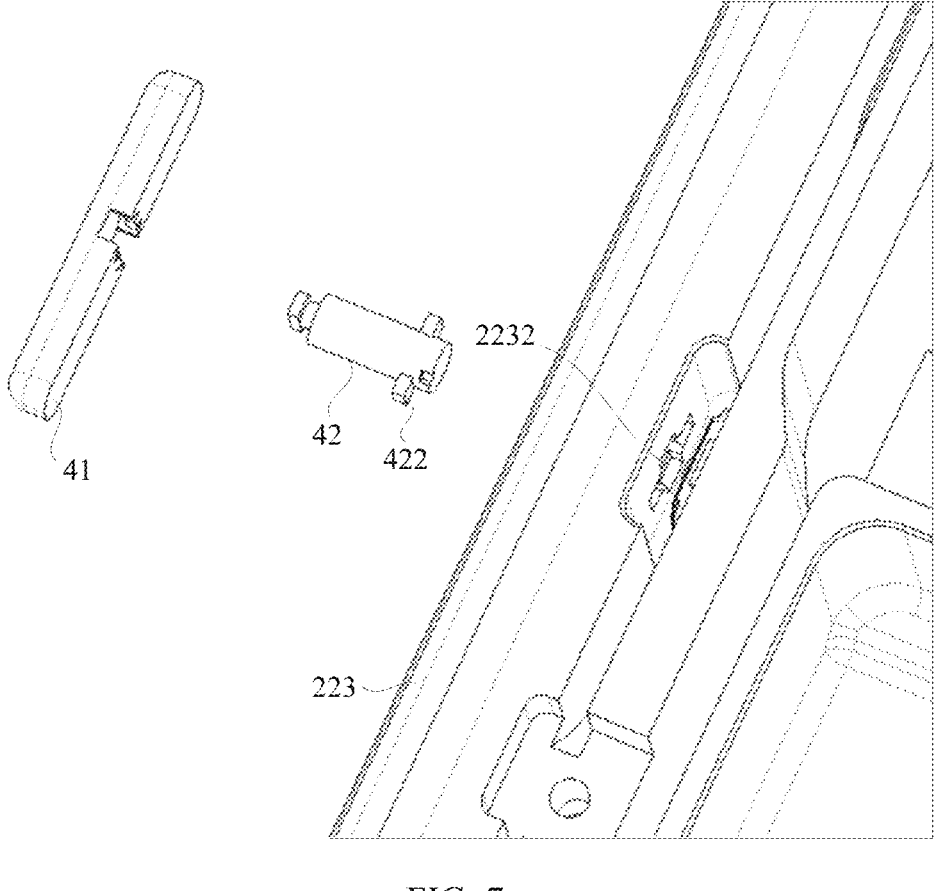
FIG. 7 is a schematic diagram 1 of a process of assembling a button assembly on a middle frame according to an embodiment of this application.
Figure 8:
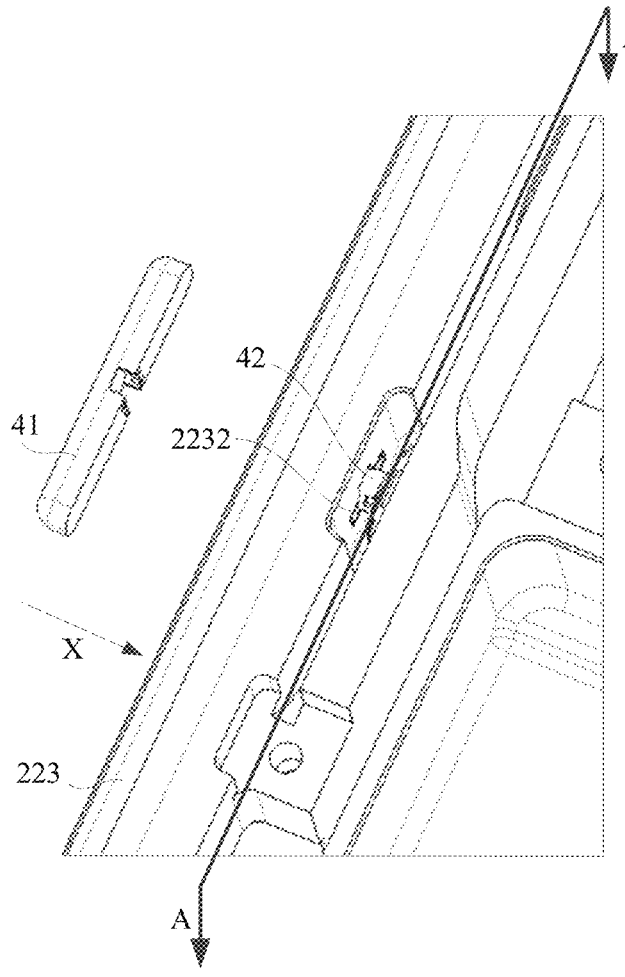
FIG. 8 is a schematic diagram 2 of a process of assembling a button assembly on a middle frame according to an embodiment of this application.
Figure 9:
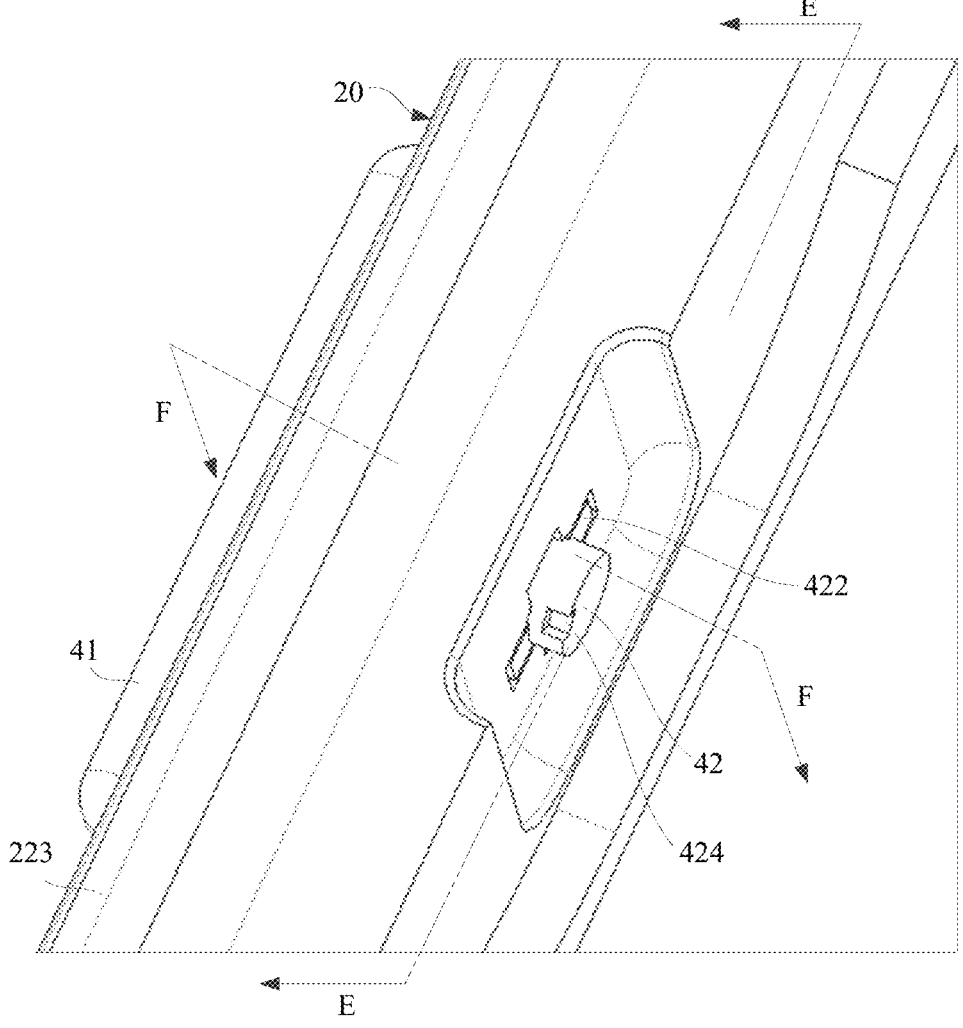
FIG. 9 is a schematic diagram 3 of a process of assembling a button assembly on a middle frame according to an embodiment of this application.
Figure 10:
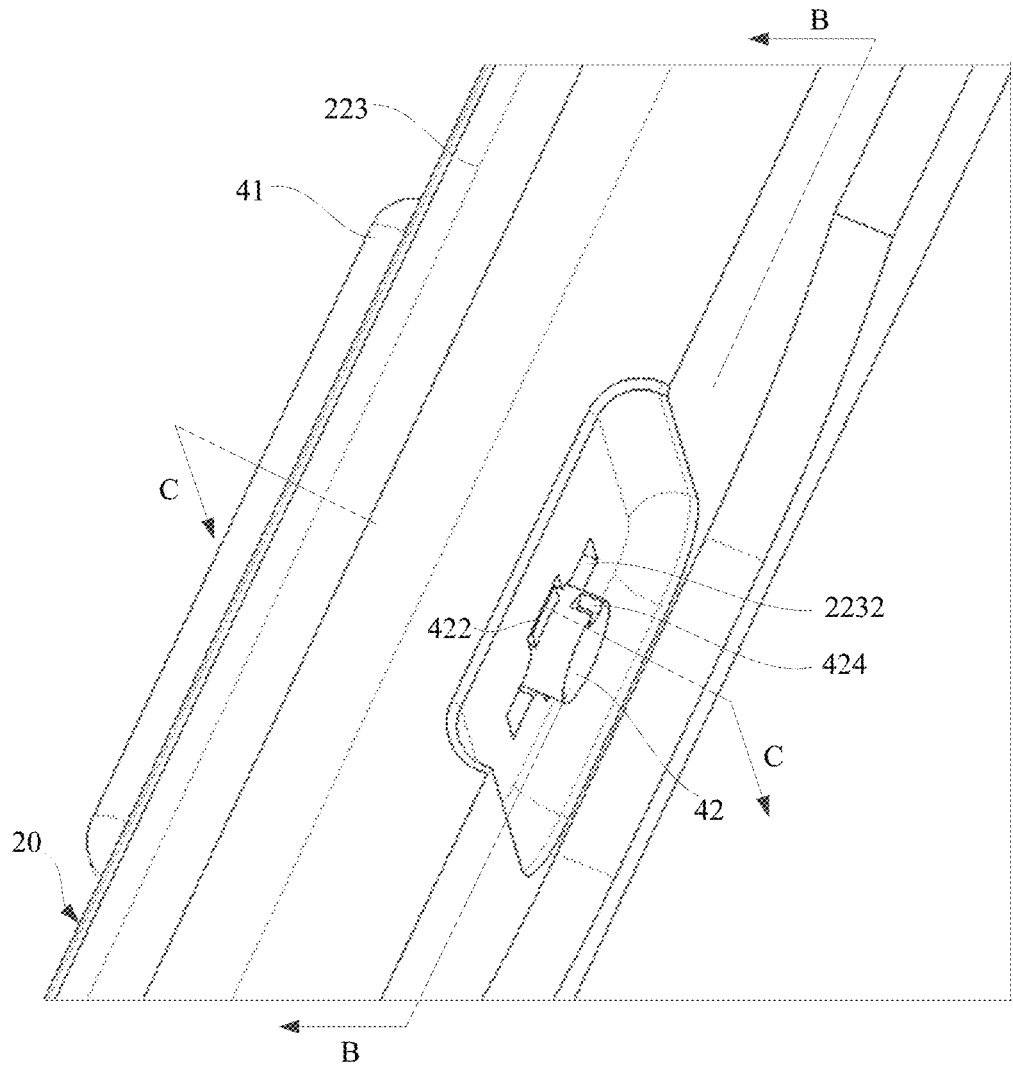
FIG. 10 is a schematic diagram 4 of a process of assembling a button assembly on a middle frame according to an embodiment of this application.

FIG. 7 to FIG. 10 illustrate a process of assembling a button assembly on a middle frame according to embodiments of this application. A middle frame illustrated in FIG. 9 and FIG. 10 is a partial structure of a right border frame in FIG. 8 after being sectioned from an A-A direction, to facilitate observing an assembly of a button assembly 40 on the right border frame 223.

As shown in FIG. 7, a bottom of a button slot 2231 is provided with a via hole 2232 that penetrates an outer wall and an inner wall of a middle frame 20, and the via hole 2232 is connected to the button slot 2231. This facilitates assembling the button assembly 40 on the middle frame 20. The inner wall of the middle frame 20 may be understood as a side wall, deviating from a side of the button slot 2231, of the middle frame 20.

As shown in FIG. 8 to FIG. 10, a trigger member 42 passes the via hole 2232, a first terminal of the trigger member 42 is connected to a button 41, and a second terminal of the trigger member 42 has a first assembly part 422.

As shown in FIG. 8 to FIG. 10, the trigger member 42 is disposed in the via hole 2232 and rotates relative to the button 41 and the middle frame 20. In other words, the trigger member 42 rotates in the via hole 2232. The trigger member 42 rotates in the via hole 2232 to a pre-assembly position (as shown in FIG. 9) or an assembly position (as shown in FIG. 10).

Figure 11:
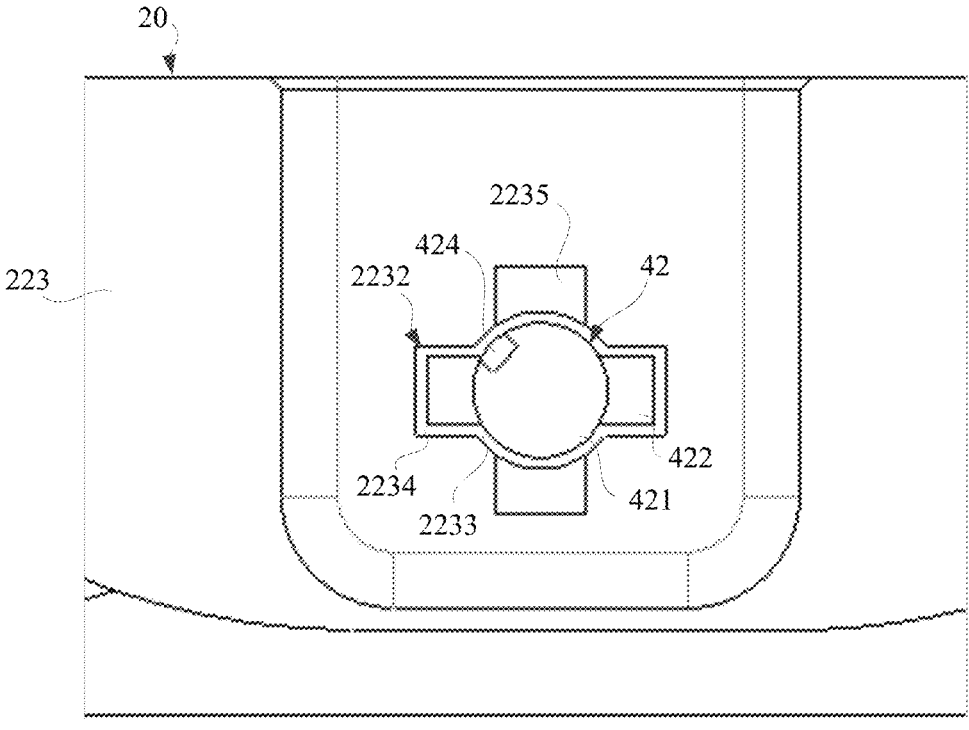
FIG. 11 is a view of an assembly of an end part of a trigger member and a middle frame in FIG. 9.
Figure 12:
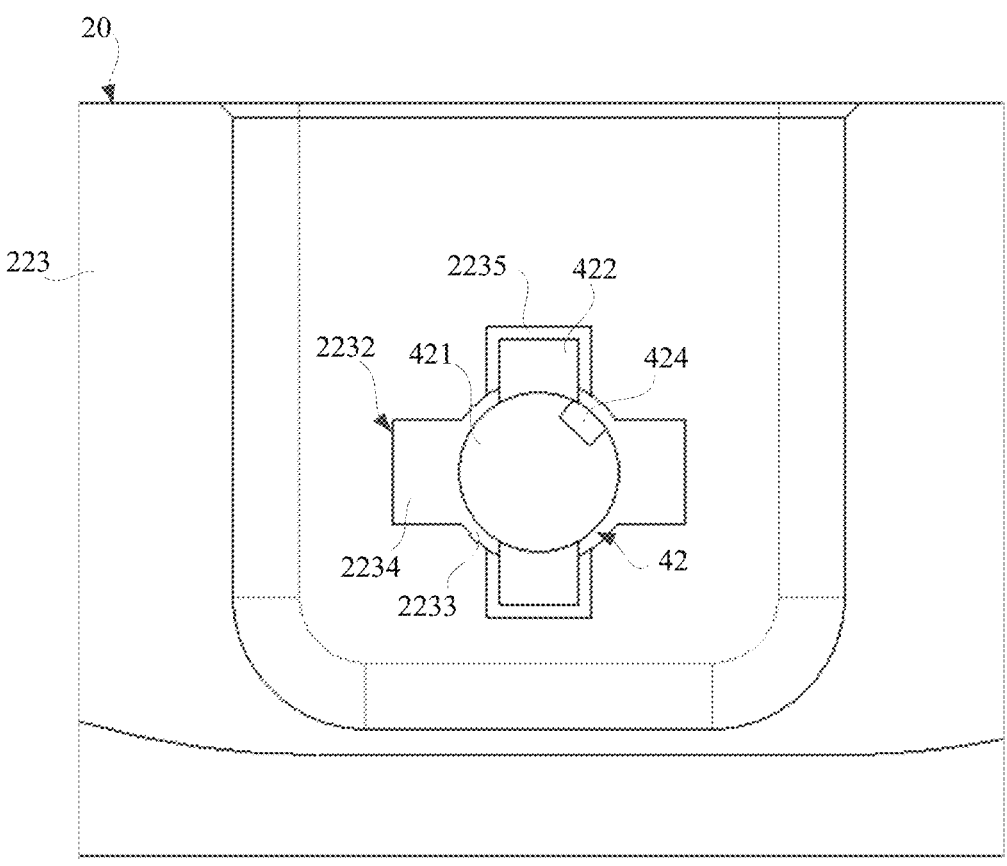
FIG. 12 is a view of an assembly of an end part of a trigger member and a middle frame in FIG. 10.

FIG. 11 is a view of an assembly of an end part of a trigger member and a middle frame in FIG. 9. FIG. 12 is a view of an assembly of an end part of a trigger member and a middle frame in FIG. 10.

As shown in FIG. 11 and with reference to FIG. 9, when the trigger member 42 rotates in the via hole 2232 to the pre-assembly position, a first assembly part 422 is disposed opposite to the via hole 2232, and the first assembly part 422 freely moves in an axial direction of the via hole 2232 relative to the via hole 2232. In this case, the trigger member 42 passes through the via hole 2232, to facilitate the assembly of the trigger member on the middle frame 20 and a disassembly of the button assembly 40. As shown in FIG. 12 and with reference to FIG. 10, when the trigger member 42 rotates in the via hole 2232 to the assembly position, the first assembly part 422 abuts against the inner wall of the middle frame 20, to limit the trigger member 42 to move toward the outer wall of the middle frame 20. Therefore, while the button assembly 40 is assembled on the middle frame 20, the button assembly 40 does not fall out from the middle frame 20.

In this way, after the button 41 and the trigger member 42 are assembled on the middle frame 20 such as the right border frame 223, the trigger member 42 rotates from the pre-assembly position to the assembly position, to complete the assembly of the button assembly 40 on a border frame 22. Alternatively, the trigger member 42 rotates from the assembly position to the pre-assembly position by rotating the trigger member 42 in a reverse direction. When the trigger member 42 is disposed in the pre-assembly position, the first assembly part 422 is disposed opposite to the via hole 2232. In this way, at the pre-assembly position, the first assembly part 422 may pass through the via hole 2232 along the axial direction of the via hole 2232, to quickly disassemble the trigger member 42 and the button assembly 40 in the middle frame 20 and separate the button assembly 40 from the border frame 22.

Therefore, in this embodiment, the button assembly 40 may be quickly disassembled and assembled on the middle frame 20 such as the right border frame 223 through rotation, to reduce an assembly risk of the button assembly 40, increase a success rate, improve reliability of assembling the button assembly 40 on the middle frame 20, obtain better hand feeling, reduce manufacturing costs of an electronic device, and help the electronic device to get thinner and lighter.

The button 41 is used to drive the trigger member 42 to move toward the inner wall of the middle frame (that is, an inner part of the electronic device), to trigger a conductive member in the electronic device. Therefore, when a user presses the button 41 (for example, when the button assembly 40 is in a pressed state), functions of the button of the button assembly 40 on the electronic device may be enabled.

It should be noted that, in a process of assembling the button assembly 40 on the border frame 22 such as the right border frame 223, first, as shown in FIG. 7, the first assembly part 422 of the trigger member 42 is disposed opposite to the via hole 2232, to enable the trigger member 42 to pass through the via hole 2232 in the button slot 2231 on the right border frame 223 as shown in FIG. 8. Then, the button 41 is assembled in the button slot 2231 by pushing or the like along a width direction of the electronic device such as a mobile phone 100 (that is, an X direction in FIG. 8), to move the trigger member 42 to the pre-assembly position while the button 41 is assembled. In this way, the first assembly part 422 is disposed opposite to the via hole 2232 (as shown in FIG. 9). Finally, an auxiliary tool such as a rotary rod or a clamp, acts on the trigger member 42, to enable the trigger member 42 to abut against the inner wall of the middle frame 20 through the first assembly part 422 after the trigger member 42 rotates in the via hole 2232 to a preset angle. In this case, the button assembly 40 is disposed at the assembly position (for example, the position shown in FIG. 10) on the right border frame 223 of the middle frame 20, and the button assembly 40 is assembled on the middle frame 20. When being pressed, the button assembly 40 may be conducted to the conductive member, to enable a pressing function of the button assembly 40 on the electronic device.

In this embodiment, after the button 41 is assembled in the button slot 2231, the first assembly part 422 may be disposed in an inner part of the via hole 2232 as shown in FIG. 9. To enable the first assembly part 422 to easily abut against the middle frame 20, before the trigger member 42 rotates in the via hole 2232 to the preset angle, the button 41 needs to be pushed, to enable the first assembly part 422 to move toward the middle frame 20 along the X direction and extend outside the via hole 2232, thereby moving the trigger member 42 to the pre-assembly position.

Alternatively, in some embodiments, after the button 41 is assembled in the button slot 2231, the first assembly part 422 may be exposed outside the via hole 2232. In this case, after the button 41 is assembled in the button slot 2231, the trigger member 42 may directly rotate to the pre-assembly position by using the auxiliary tool.

Because the button 41 is disposed in the button slot 2231, the button slot 2231 has a specific limiting effect on the button 41. Therefore, during the rotation of the trigger member 42, a position of the button 41 relative to the middle frame 20 remains unchanged. In this embodiment of this application, the button assembly 40 may be quickly disassembled and assembled on the middle frame 20 only by rotating the trigger member 42 in the via hole 2232 relative to the button 41 and the middle frame 20.

It should be noted that, when the button assembly 40 is disposed on a different position on the middle frame 20, moving directions of the button 41 and the trigger member 42 on the middle frame 20 are different during an assembly process. In this embodiment, the moving directions of the button 41 and the trigger member 42 on the middle frame 20 during the assembly process are not further limited.

In comparison with the related technology 1 and the related technology 2, in this embodiment of this application, because the trigger member 42 abuts against the inner wall of the middle frame 20 at the assembly position through the first assembly part 422, while the button assembly 40 is assembled on the middle frame 20, disposing of a bolt 43 in the button assembly 40a, a steel sheet, and the hanging platform 414 on the button 41a is avoided, and the structure of the button assembly 40 is simplified. Therefore, the button assembly 40 has a feature of miniaturization. This reduces installation space occupied by the button assembly 40 on the electronic device, increases structural strength of the middle frame 20, reduces a reliability risk of the electronic device, reduces the assembly risk of the button assembly 40 on the middle frame 20, and improves assembly reliability. Therefore, impact on hand feeling of the button during the assembly process is avoided, a process success rate and an assembly success rate of the button assembly 40 are increased, and the manufacturing costs of the electronic device such as the mobile phone 100 are reduced. This ensures a relatively thick wall of the middle frame 20, and meets a requirement for processing insulation space on the border frame 22 in cooperation with an antenna. Therefore, in the thinner and lighter design of the electronic device such as the mobile phone 100, design requirements for the reliability, the hand feeling of the button, and space of a radiator, and the like are met, and the thinner and lighter design of the electronic device such as the mobile phone 100 is implemented.

In addition, in comparison with the related technology 1 and the related technology 2, in this embodiment of this application, due to the button assembly 40, the trigger member 42 may rotate to the assembly position from the pre-assembly position through rotation, and the first assembly part 422 is offset relative to the via hole 2232 and blocked in the middle frame 20, and then abuts against the middle frame 20, to lock the button assembly 40 on the middle frame 20. This simplifies the assembly of the button assembly 40 on the middle frame 20, further reduces the assembly risk of the button assembly 40 on the middle frame 20, improves the assembly reliability, and improves the assembly success rate of the button assembly 40, to avoid impact on the hand feeling of the button in a process of assembling the button assembly 40 and reduce the manufacturing costs of the electronic device such as the mobile phone 100. In addition, when the trigger member 42 abuts against the middle frame 20 at the assembly position, the trigger member 42 is limited to move toward the outer wall of the middle frame 20, to prevent the button assembly 40 from falling out of the middle frame 20, prevent the button assembly 40 from separating from the middle frame 20, and ensure the functions of the button of the button assembly 40 on the electronic device.

In addition, in comparison with the related technology 1 and the related technology 2, due to disposing of the button assembly 40, disposing of a bolt slot or a steel sheet slot on the middle frame 20 may be avoided. This effectively avoids disposing of openings on the middle frame 20, simplifies a structure of the middle frame 20, increases strength of the middle frame 20, increases an effective adhering width between the middle frame 20 and a battery cover 30, and reduces a risk of ingress of liquid at an adhering part between the middle frame 20 and the battery cover 30 of the electronic device such as the mobile phone 100, to meet requirements for waterproof performance of the electronic device in the thinner and lighter design. Therefore, in the thinner and lighter design, the foregoing problems of the electronic device are resolved, to enable the electronic device to be lightened and thinned.

As shown in FIG. 11 and FIG. 12, the trigger member 42 includes a trigger body 421. The trigger body 421 extends in a radial direction of the via hole 2232. The trigger body 421 has the second terminal. The first assembly part 422 is disposed on a side wall of the trigger body 421 (for example, a circumferential surface of the trigger body 421 in a direction of the rotation thereof). A shape of a cross section of the via hole 2232 matches shapes of the trigger body 421 and the first assembly part 422. When the trigger member 42 rotates in the via hole 2232 to the pre-assembly position, the trigger body 421 and the first assembly part 422 may pass the via hole 2232. When the trigger member 42 rotates in the via hole 2232 to the assembly position, the first assembly part 422 abuts against the inner wall of the middle frame 20, to limit the trigger member 42 to move toward the outer wall of the middle frame 20. In this way, the trigger member 42 passes the via hole 2232 to assemble the button assembly 40 on the middle frame 20 through rotation. In addition, when the trigger member 42 rotates in the via hole 2232 from the pre-assembly position to the assembly position relative to the middle frame 20 and the button 41, the first assembly part 422 is offset relative to the via hole 2232. Therefore, when the first assembly part 422 rotates in the via hole 2232 to the pre-assembly position, the first assembly part 422 may abut against the middle frame 20, and while the button assembly 40 is assembled on the middle frame 20, the button assembly 40 does not move toward the outer wall of the middle frame 20. This prevent the button assembly 40 from falling out of the middle frame 20.

To facilitate the rotation of the trigger member 42, as shown in FIG. 11 and FIG. 12, the via hole 2232 may include a first through hole 2233 and a second through hole 2234 that are connected to each other. A shape of a cross section of the first through hole 2233 is adapted to a shape of a cross section of the trigger body 421. The shape of the cross section of the trigger body 421 may be understood as a shape of a cross section that is of the trigger body 421 and is perpendicular to an extension direction of the trigger body 421. A shape of a cross section of the second through hole 2234 is adapted to a shape of a cross section of the first assembly part 422. To be specific, the shape of the cross section of the via hole 2232 is adapted to a shape of the cross section that is of the trigger member 42 and at which the first assembly part 422 is disposed. A direction of a cross section at which the shape of the cross section of the first assembly part 422 is disposed is the same as a direction of the cross section at which the shape of the cross section of the trigger body 421 is disposed. The second through hole 2234 is disposed on a side of the first through hole 2233. In this way, the trigger body 421 may be threaded in the first through hole 2233 and may rotate in the first through hole 2233. The first assembly part 422 may pass the second through hole 2234 in a process of assembling the first assembly part 422 in the middle frame 20. When the trigger member 42 rotates to the pre-assembly position, the first assembly part 422 may be disposed opposite to the second through hole 2234. Therefore, the first assembly part 422 may freely move along an axial direction of the second through hole 2234 relative to the second through hole 2234 and pass the second through hole 2234, to quickly disassemble the button assembly 40 on the middle frame 20. When the trigger member 42 rotates in the via hole 2232 to the assembly position through the trigger body 421, compared to the pre-assembly position, the first assembly part 422 is offset relative to the second through hole 2234 (such as a disposing in a staggering manner in FIG. 12). Therefore, the first assembly part 422 abuts against the inner wall of the middle frame 20 and is blocked in the middle frame 20. This achieves a purpose of preventing the button assembly 40 from falling out of the middle frame 20, to stably assemble the button assembly 40 in the middle frame 20.

In this embodiment, the shapes and dimensions of the trigger body 421, the first assembly part 422, the first through hole 2233, and the second through hole 2234 are not further limited, provided that the trigger member 42 may pass the via hole 2232, rotate to the assembly position, and abut against the middle frame 20. While the trigger body 421 rotates in the first through hole 2233, a size of an opening of the first through hole 2233 is reduced, for example, the first through hole 2233 may be but is not limited to a circle. The second through hole 2234 may be but is not limited to a rectangular, a trapezoid, a semi-circle, or another shape that is adapted to a shape of an outer edge of the first assembly part 422.

To avoid the trigger member 42 from continuously rotating in the assembly position, as shown in FIG. 11 and FIG. 12, the inner wall of the middle frame 20 has a limiting part 2235. The limiting part 2235 is disposed on a side of the via hole 2232. When the trigger member 42 rotates in the via hole 2232 to the assembly position, the first assembly part 422 abuts against the limiting part 2235, to limit the trigger member 42 to rotate. In this way, when the limiting part 2235 abuts against the first assembly part 422, the trigger member 42 may be limited. Therefore, the trigger member 42 does not have a rotational degree of freedom, to prevent the trigger member 42 from continuously rotating in the via hole 2232 relative to the middle frame 20 and the button 41 at the assembly position. This effectively prevents the button assembly 40 from falling out of the middle frame 20 in a non-use state.

In this embodiment, as shown in FIG. 11 and FIG. 12, the limiting part 2235 may be a groove that is disposed on the middle frame 20 such as the right border frame 223 and that is adapted to a structure of the first assembly part 422, and the groove is connected to a side wall of the via hole 2232. When the trigger member 42 rotates in the via hole 2232 to the assembly position, the first assembly part 422 may be disposed in the groove, and may abut against at least one part of a wall of the groove. The first assembly part 422 may abut against a bottom of the groove. Alternatively, the first assembly part 422 may abut against a bottom of the groove and the wall of the groove. In this way, the trigger member 42 is limited by the groove. Therefore, under drive of the button 41, the trigger member 42 may easily fall out the limiting part 2235, may be disconnected from the middle frame 20, and may move toward the inner wall of the middle frame 20 along the width direction of the electronic device such as the mobile phone 100, to trigger the conductive member. This enables the functions of the button of the electronic device, simplifies the structure of the middle frame 20, reduces the wall thickness of the middle frame 20, reduces the manufacturing costs of the electronic device, and facilitates the thinner and lighter design of the electronic device.

Alternatively, in some embodiments, the limiting part 2235 may also be a limiting boss or a limiting post on the middle frame 20 such as the right border frame 223. The limiting boss and the limiting post may be disposed in a movement path of the trigger member 42 and disposed opposite to the trigger member 42. Therefore, when moving toward a direction of the outer wall (for example, an outer part of the mobile phone 100) of the middle frame along the width direction of the electronic device such as the mobile phone 100, the trigger member 42 may be engaged with the limiting boss or the limiting post. Alternatively, in some embodiments, the limiting part 2235 may also be a limiting baffle or another limiting structure on the middle frame 20, and the limiting baffle may be disposed on the side of the first assembly part 422. Therefore, when rotating at the assembly position, the trigger member 42 may abut against the limiting baffle to achieve a limiting purpose. In this embodiment of this application, a structure of the limiting part 2235 is not further limited.

The following further describes a structure of the electronic device in this embodiment of this application by using the groove as an example.

To facilitate the first assembly part 422 in abutting against the groove, in this embodiment, after the trigger member 42 rotates to the preset angle at the assembly position from the pre-assembly position, the trigger member 42 also needs to move toward the outer part of the mobile phone 100 along the width direction of the electronic device such as the mobile phone 100 under pushing of an external force, until the first assembly part 422 abuts against the groove. In this case, the button assembly 40 is disposed at the assembly position on the middle frame 20, and the assembly of the button assembly 40 on the middle frame 20 is completed.

The preset angle may be but is not limited to 90°. In some embodiments, the preset angle may also be 45°, 60°, 80°, or the like. In this embodiment, the preset angle is set to 90°. This increases stability of a connection among the button 41, the trigger member 42, and the middle frame 20. To ensure that when the preset angle is set to 90°, the first assembly part 422 may abut against the limiting part 2235 such as the groove, and the groove is disposed perpendicular to the via hole 2232.

The limiting part 2235 such as the groove may be disposed at a circumference of the first through hole 2233 and disposed on a side of the second through hole 2234. At the preset angle of 90°, the groove may be disposed perpendicular to the second through hole 2234. Ibis ensures that the trigger member 42 is threaded in the middle frame 20 through the via hole 2232 and may abut against the groove through the first assembly part 422 after the trigger member 42 rotates to the preset angle at the pre-assembly position.

It should be noted that, the preset angle depends on a disposing position of the limiting part 2235 on the middle frame 20 relative to the second through hole 2234. Therefore, the preset angle may be properly adjusted based on the disposing position of the limiting part 2235 and the second through hole 2234 on the middle frame 20. In this embodiment, the preset angle is not further limited.

It can be seen from FIG. 11 and FIG. 12, at least two (for example, two or more) first assembly parts 422 may be disposed on the trigger member 42. A quantity of limiting parts 2235 equals a quantity of first assembly parts 422, and the limiting parts are in a one-to-one correspondence with the first assembly parts. As shown in FIG. 11 and FIG. 12, in this embodiment, two first assembly parts 422 on the trigger member 42, and the two first assembly parts 422 are disposed at intervals around the via hole 2232, for example, the two first assembly parts 422 may be symmetrically disposed on the trigger body 421. In this way, the stability of the connection between the trigger member 42 and the middle frame 20 is further enhanced and a better effect of preventing the button assembly 40 from falling out of the middle frame 20 is obtained. In addition, the quantity of the first assembly parts 422 is effectively reduced. This simplifies the structures of the trigger member 42 and the middle frame 20, facilitates further increasing the strength of the middle frame 20, helps miniaturization of the button assembly 40, and helps the electronic device to get thinner and lighter.

It should be noted that, in some embodiments, there may be one first assembly part 422 on the trigger member 42. In this embodiment, the quantity of first assembly parts 422 on the trigger member 42 is not further limited.

As shown in FIG. 11 and FIG. 12, the first assembly part 422 may include but is not limited to a boss on the trigger member 42 or another assembly structure capable of being engaged with the middle frame 20. A structure of the boss is adapted to a structure of the groove, for example, the boss may include but is not limited to a strip block whose end part extends along an axial direction perpendicular to the via hole 2232. In this embodiment, because the first assembly part 422 has the boss, an abutting area between the first assembly part 422 and the limiting part 2235 is increased, and stability of the connection between the first assembly part 422 and the middle frame 20 is enhanced. This ensures that the button assembly 40 is effectively blocked in the middle frame 20 at the assembly position, and prevents the button assembly 40 from falling out of the middle frame 20. Therefore, when being not pressed, the button assembly 40 may be stably assembled on the middle frame 20.

When the trigger member 42 rotates in the via hole 2232 to the assembly position, the first assembly part 422 is engaged with the inner wall of the middle frame 20 such as the right border frame 223, and the first terminal of the trigger member 42 is engaged with the button 41, to limit the trigger member 42 and the button 41 move toward the outer wall of the middle frame 20 such as the right border frame 223. This ensures that the button assembly 40 is assembled on the middle frame 20, to prevent the button assembly 40 from falling out of the middle frame 20. In addition, in comparison with a manner of fastening the button assembly 40a in the middle frame 20 in the related technology 1 and the related technology 2, disposing of the bolt 43 and the steel sheet is concealed. Therefore, a material and an assembly station in the button assembly 40 are reduced, and a process of assembling the button assembly 40 in the middle frame 20 is simplified, to reduce the reliability risk and the manufacturing costs of the whole electronic device in the thinner and lighter design, effectively prevent the bolt 43 from falling out during the assembly process, and effectively prevent the gum from being activated in advance in a process of assembling the steel sheet in the middle frame 20. This ensures the hand feeling of the button of the electronic device.

In addition, in this embodiment of this application, while the button assembly 40 is assembled on the middle frame 20, in comparison with the related technology 1, disposing of the hanging platform 414 is concealed. This effectively resolves problems that the button gets stuck and the hand feeling is poor because of a deformation of the hanging platform 414.

Figure 13:
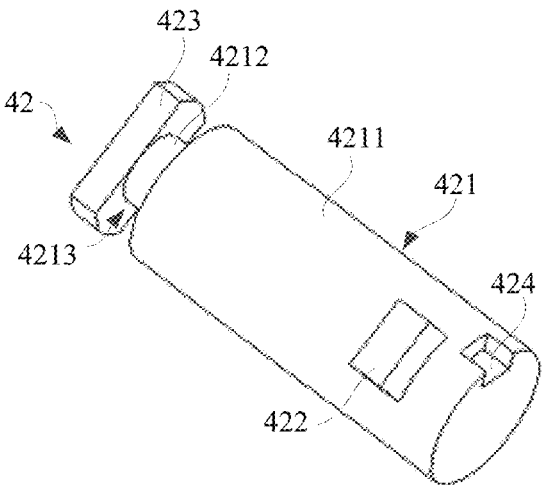
FIG. 13 is a schematic diagram of a structure of a trigger member according to an embodiment of this application.
Figure 14:
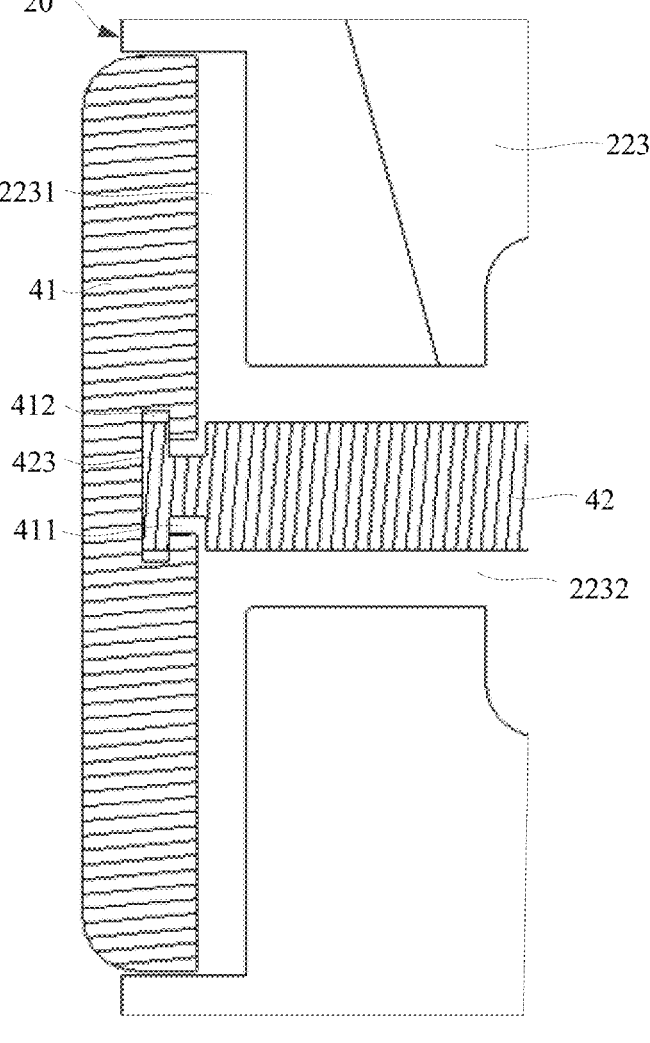
FIG. 14 is a sectional view along a direction B-B in FIG. 10.
Figure 15:
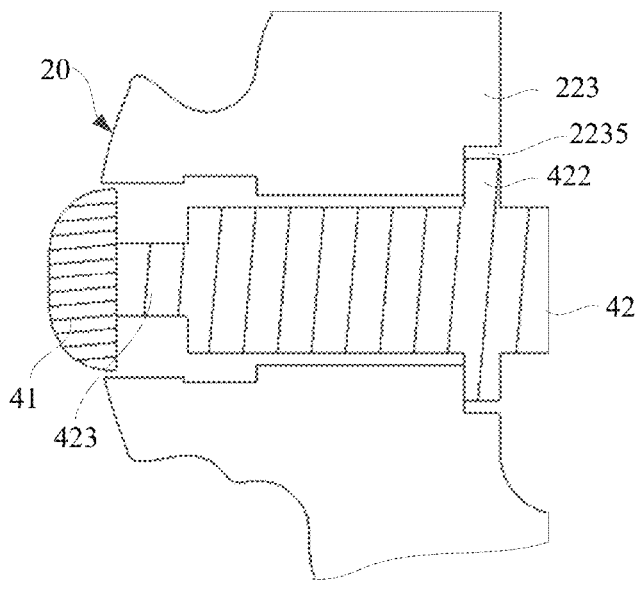
FIG. 15 is a sectional view along a direction C-C in FIG. 10.

FIG. 13 is a schematic view of a structure of a trigger member, FIG. 14 is a sectional view in a B-B direction in FIG. 10, and FIG. 15 is a sectional view in a C-C direction in FIG. 10. At the assembly position, the assembly of the trigger member 42 in the button 41 and the middle frame 20 may be better understood from the figures.

As shown in FIG. 13 to FIG. 15, the first terminal of the trigger member 42 has a second assembly part 423, to facilitate the trigger member 42 being engaged with the button 41. When the trigger member 42 rotates in the via hole 2232 to the assembly position, the second assembly part 423 may be disposed in the button 41 and engaged with the button 41 (as shown in FIG. 14), to limit the trigger member 42 and the button 41 to move toward the outer wall of the middle frame 20. In this case, when the button assembly 40 is not pressed (for example, not in use), the trigger member 42 and the middle frame 20 such as the right border frame 223 are in a mutual engaging and fitting relationship through the first assembly part 422, and the button 41 and the trigger member 42 are in the mutual engaging and fitting relationship through the second assembly part 423. When being not pressed, the button assembly 40 does not move toward the outer wall of the middle frame 20. This prevents the button assembly 40 from falling out of the right border frame 223 of the middle frame 20.

In this embodiment, based on the first assembly part 422, due to disposing of second assembly part 423, the trigger member 42 is stably connected to the button 41, to easily trigger the assembly and the rotation of the trigger member 42 in the button 41. Therefore, the trigger member 42 and the button 41 are in the mutual engaging and fitting relationship, to assemble the button assembly 40 in the right border frame 223.

The following further describes a principle that the button assembly 40 triggers the functions of the button of the electronic device in this embodiment with reference to the accompanying drawings.

Figure 16:
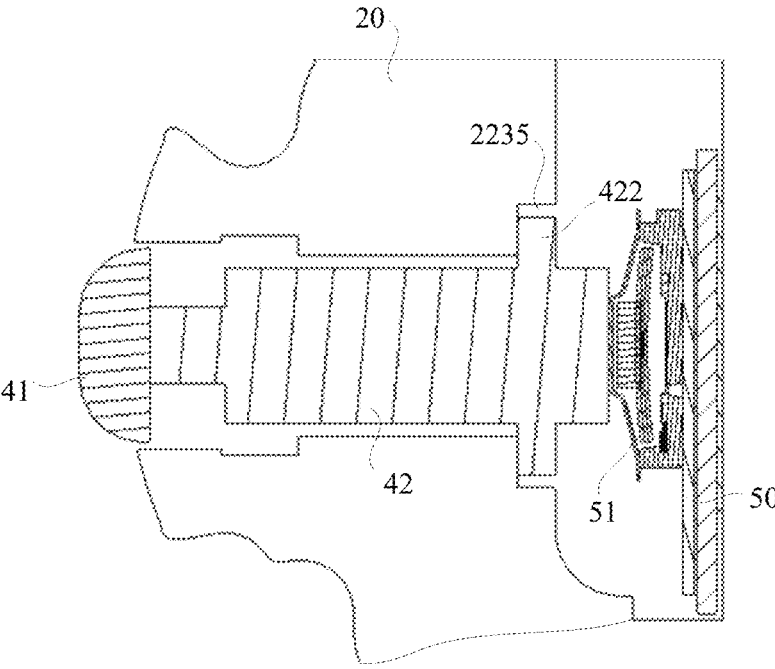
FIG. 16 is a schematic diagram of an assembly of a button assembly and a button circuit board in FIG. 15.

FIG. 16 is a schematic diagram of an assembly of a button assembly and a button circuit board in FIG. 15.

As shown in FIG. 16, the electronic device also includes a button circuit board 50. The button circuit board 50 may include but is not limited to a flexible circuit board. A conductive member 51 is disposed on the button circuit board 50. The conductive member 51 is disposed in the middle frame 20 and abuts against the second terminal of the trigger member 42. For example, the conductive member 51 may include but is not limited to a metal dome on the button circuit board 50. The trigger member 42 is configured to move toward a direction facing the inner wall of the middle frame 20 under the drive of the button 41, to trigger an elastic deformation of a side, facing the button circuit board 50, of the conductive member 51, and conduct the conductive member 51 with the button circuit board 50. In this way, when the button 41 is pressed, the button 41 drives the trigger member 42 to move toward the inner part of the electronic device, to compress the conductive member 51, to enable the conductive member 51 to be elastically deformed toward a side of the button circuit board 50, and then enable the conductive member 51 to be conducted to the button circuit board 50. While the functions of the button of the electronic device are enabled, due to disposing of the conductive member 51, the trigger member 42 and the button assembly 40 are further fastened in the middle frame 20, to enhance stability of assembling the button assembly 40 in the middle frame 20.

It should be noted that, when an external force applied to the button 41 by the user is withdrawn, under a reaction force of the conductive member 51, the trigger member 42 moves toward the outer part of the mobile phone 100 along the width direction of the electronic device such as the mobile phone 100 (for example, the X direction in FIG. 8). Therefore, the first assembly part 422 abuts against the limiting part 2235, to engage the trigger member 42 with the middle frame 20. This enables the button assembly 40 to be located at the assembly position on the middle frame 20, to facilitate next pressing by the user.

The following further describes the structure of the electronic device in this embodiment of this application with reference to the accompanying drawings.

Figure 17:
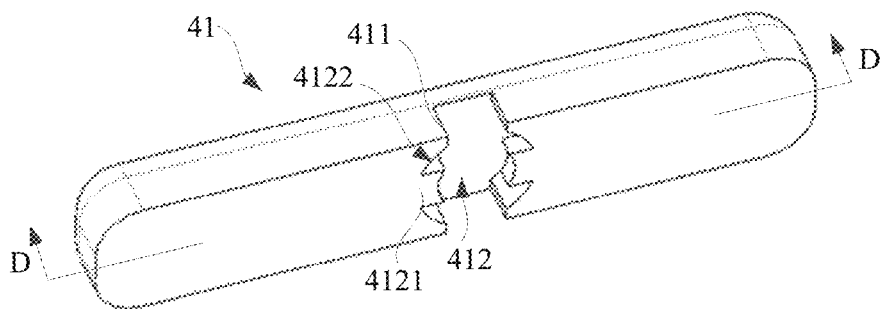
FIG. 17 is a schematic diagram 1 of a structure of a button according to an embodiment of this application.
Figure 18:
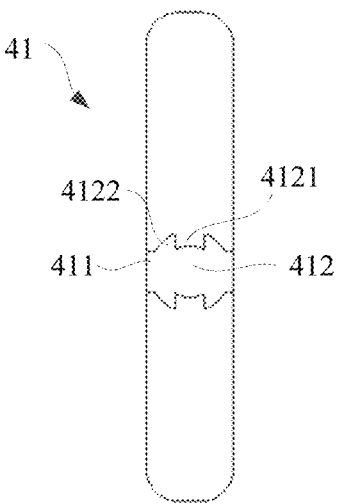
FIG. 18 is a schematic diagram 2 of a structure of a button according to an embodiment of this application.
Figure 19:
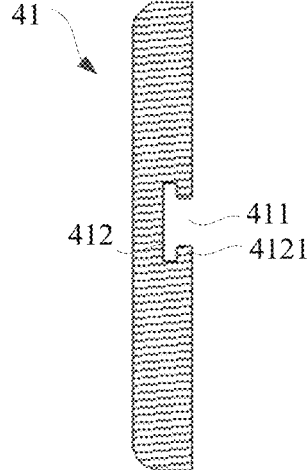
FIG. 19 is a sectional view along a direction D-D in FIG. 17.

FIG. 17 and FIG. 18 are separate schematic views of a structure of a button at different views. FIG. 19 is a section view of the button in a D-D direction in FIG. 17.

To connect a trigger member 42 to a button 41, in some embodiments, with reference to FIG. 17 to 19, the button 41 has an assembly cavity 412 and an assembly hole 411 through which a second assembly part 423 passes. The assembly hole 411 is connected to the assembly cavity 412. The second assembly part 423 is disposed in the assembly cavity 412 through the assembly hole 411 and engaged with the button 41, to limit the button 41 to move toward an outer wall of a middle frame 20. A structure of the assembly hole 411 is adapted to a structure of the second assembly part 423. A first assembly part 422 and the second assembly part 423 are separately disposed on the trigger member 42 such as a trigger body 421 in different directions in a circumferential direction. In this way, the second assembly part 423 is assembled in the button 41, and when the trigger member 42 rotates in a via hole 2232 to an assembly position, the second assembly part 423 is blocked in the button 41 through a wall of the assembly cavity 412. Therefore, the trigger member 42 may pass the first assembly part 422 and the second assembly part 423 by one rotation, to connect the trigger member 42 to the button 41 and the middle frame 20.

Figure 20:
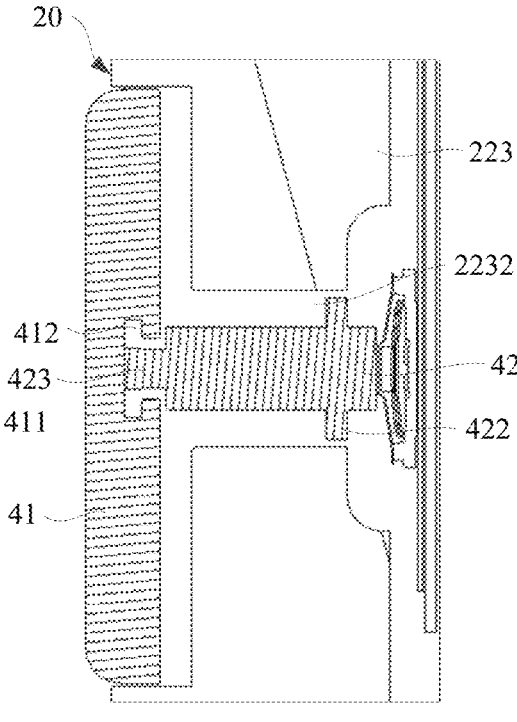
FIG. 20 is a sectional view along a direction E-E in FIG. 9.
Figure 21:
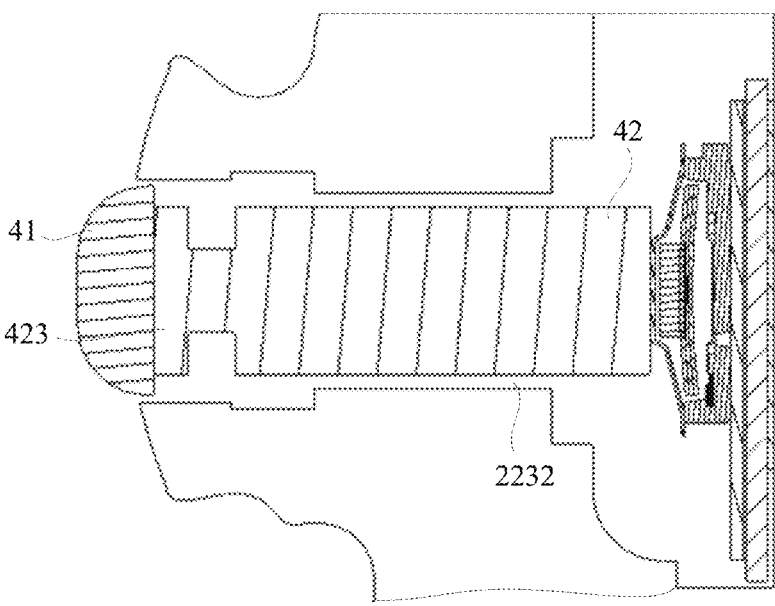
FIG. 21 is a sectional view along a direction F-F in FIG. 9.
Figure 22:
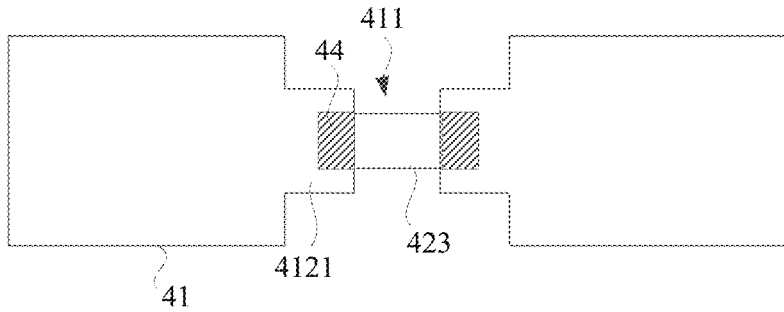
FIG. 22 is a schematic diagram 1 in which a trigger member abuts against a button according to an embodiment of this application.
Figure 23:
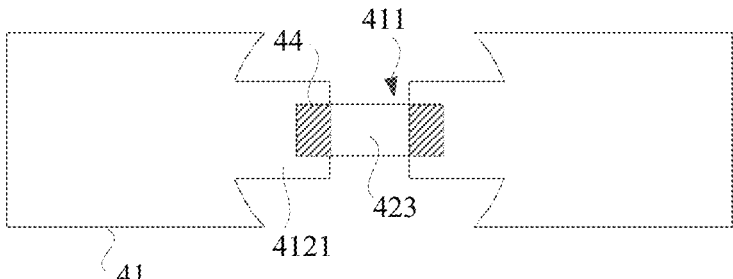
FIG. 23 is a schematic diagram 2 in which a trigger member abuts against a button according to an embodiment of this application.
Figure 24:
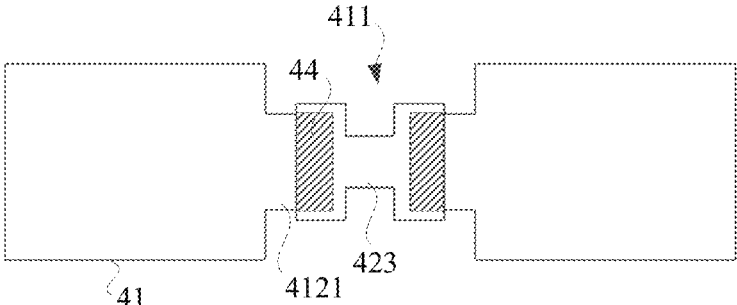
FIG. 24 is a schematic diagram 3 in which a trigger member abuts against a button according to an embodiment of this application.
Figure 25:
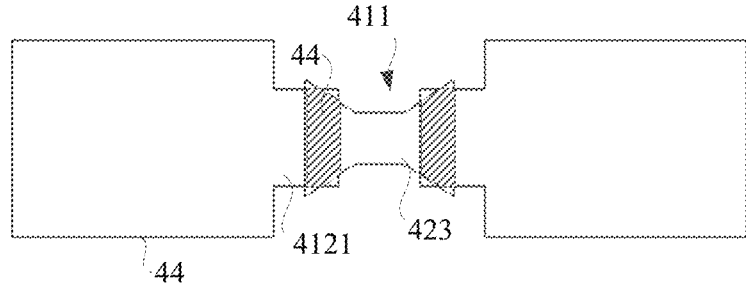
FIG. 25 is a schematic diagram 4 in which a trigger member abuts against a button according to an embodiment of this application.

FIG. 20 is a sectional view in an E-E direction in FIG. 9 and FIG. 21 is a sectional view in an F-F direction in FIG. 9. When the trigger member 42 is located at a pre-assembly position, an assembly of the trigger member 42 in the button 41 and the middle frame 20 may be better understood from the figures.

The second assembly part 423 is disposed in the assembly cavity 412 through rotation. As shown in FIG. 20 and FIG. 21, when the trigger member 42 rotates in the via hole 2232 to the pre-assembly position, the second assembly part 423 is disposed in the assembly cavity 412 and disposed opposite to the assembly hole 411, the second assembly part 423 may pass the assembly hole 411, and the first assembly part 422 is disposed opposite to the via hole 2232. In this case, the button 41, the trigger member 42, and the middle frame 20 such as a right border frame 223 are connected without locking. Therefore, the button 41, the trigger member 42, and the right border frame 223 may be separated from each other under action of an external force.

When the trigger member 42 rotates in the via hole 2232 to the assembly position, the second assembly part 423 rotates in the assembly cavity 412, is disposed with the assembly hole 411 in a staggered manner, and is engaged with the wall of the assembly cavity 412 (as shown in FIG. 14), to limit the button 41 to move toward the outer wall of the middle frame 20. In this way, in a process in which the trigger member 42 rotates relative to the middle frame 20 and the button 41, the second assembly part 423 also rotates in the assembly cavity 412, and is offset relative to the assembly hole 411. Therefore, at the assembly position, the second assembly part 423 may rotate in the assembly cavity 412, is disposed with the assembly hole 411 in the staggered manner, and is engaged with the wall of the assembly cavity 412. Therefore, the second assembly part 423 is blocked in the button 41, to connect the trigger member 42 to the button 41 and the middle frame 20 by one rotation, and assemble the button assembly 40 on the middle frame 20.

Alternatively, the trigger member 42 may also rotate from the assembly position to the pre-assembly position by rotating the trigger member 42. Therefore, at the pre-assembly position, the first assembly part 422 may pass the via hole 2232, and the second assembly part 423 may pass the assembly hole 411, to quickly disassemble the trigger member 42 from the button 41 and the middle frame 20.

As shown in FIG. 20, the assembly hole 411 is located on the side, facing an inner part of an electronic device, of the assembly cavity 412. In this way, the trigger member 42 is connected to the button 41 while being threaded in the middle frame 20, and a structure of the trigger member 42 is simplified. This facilitates the connection between the trigger member 42 and the button 41.

In some embodiments, as shown in FIG. 17 to FIG. 20, a blocking part 4121 that extends toward a side of the assembly hole 411 is disposed on the wall of the assembly cavity 412. When the trigger member 42 rotates in the via hole 2232 to the assembly position, the blocking part 4121 is engaged with the second assembly part 423. The blocking part 4121 may be regarded as a part of the wall, facing a side of the trigger member 42, of the assembly cavity 412. In this embodiment, the blocking part 4121 may be formed by providing some openings 4122 in the wall, facing a side of the trigger member 42, of the assembly cavity 412. In this way, the second assembly part 423 is blocked in the button 41. Therefore, while the trigger member 42 is engaged with the button 41, due to disposing of the openings 4122, a structure of the button 41 is simplified, and weights of the button assembly 40 and the electronic device are reduced, to enable the electronic device to get thinner and lighter.

The second assembly part 423 may be located on an end surface of a first terminal of the trigger member 42. Alternatively, the second assembly part 423 may also be located on a circumferential surface 4211 of the trigger body 421. In this embodiment, the trigger member 42 is located on the first terminal of the trigger member 42 through the second assembly part 423 (as shown in FIG. 20). Therefore, while the trigger member 42 is connected to the button 41, the trigger member 42 is not reversely mounted on the button 41 and the middle frame 20, to quickly assemble the button assembly 40 on the middle frame 20. This reduces a risk of assembling the button assembly 40 on the electronic device, ensures hand feeling of the button, and help the electronic device such as a mobile phone 100 to get thinner and lighter.

The following further describes a structure of the electronic device in this embodiment by using an example in which the second assembly part 423 is located at the first terminal of the trigger member 42.

A rotating groove 4213 is disposed in the circumferential surface 4211 of the trigger member 42. To easily connect the second assembly part 423 to one terminal, facing the button 41, of the trigger body 421, the first terminal of the trigger member 42 has a connecting part 4212, and a structure and a size of the connecting part 4212 are smaller than that of a second terminal of the trigger body 421. In this way, while the connecting part 4212 is connected to the second assembly part 423, a rotating groove 4213 (as shown in FIG. 13) is disposed on the trigger body 421 at the connecting part 4212. At least a part of a structure of the blocking part 4121 in the button 41 may be located in the rotating groove 4213, and is engaged with the second assembly part 423 when the trigger member 42 rotates in the via hole 2232 to the assembly position, to avoid the blocking part 4121 through the rotating groove 4213, ensure that the blocking part 4121 may be engaged with the second assembly part 423, and limit the button 41 to move toward the outer wall of the middle frame 20.

FIG. 22 to FIG. 25 are schematic diagrams in which a trigger member abuts against a button.

As shown in FIG. 22 to FIG. 25, a second assembly part 423 is an assembly block on an end surface of a first terminal of a trigger member 42, and the assembly block may be a strip block that extends along a length direction of an electronic device. In this way, due to disposing of the assembly block, an engaging area 44 between the second assembly part 423 and a button 41 is increased and stability of a connection between the trigger member 42 and the button 41 is ensured. In addition, an assembly position of the trigger member 42 in a via hole 2232 is easily identified by observing a relative position of the second assembly part 423 in the button 41, to determine whether the trigger member 42 rotates to the assembly position.

For example, a structure of the strip block may be but is not limited to a bar structure in a "beeline" shape, an "I" shape, or another shape. In this embodiment, shapes and sizes of an assembly cavity 412 and the second assembly part 423 are not further limited, provided that the trigger member 42 may be engaged with the button 41 at the assembly position, to prevent the button 41 from being separated from the trigger member 42 in a width direction of the electronic device such as a mobile phone 100.

It should be noted that, because the second assembly part 423 is located in the assembly cavity 412 at the assembly position and is engaged with the button 41 while being overlapped on a blocking part 4121, an engaging area 44 may also be referred to as an overlapping area.

An extension direction of the second assembly part 423 may be perpendicular to a connection line between two first assembly parts 422 (as shown in FIG. 13). In this way, after rotating to 90° from a pre-assembly position, the trigger member 42 is located at the assembly position, and a button assembly 40 is assembled on a middle frame 20. When structures of the button 41 and the middle frame 20 are not changed, strength of the connection between the trigger member 42 and the button 41 and strength of the connection between the trigger member 42 and the middle frame 20 are increased.

Figure 26:
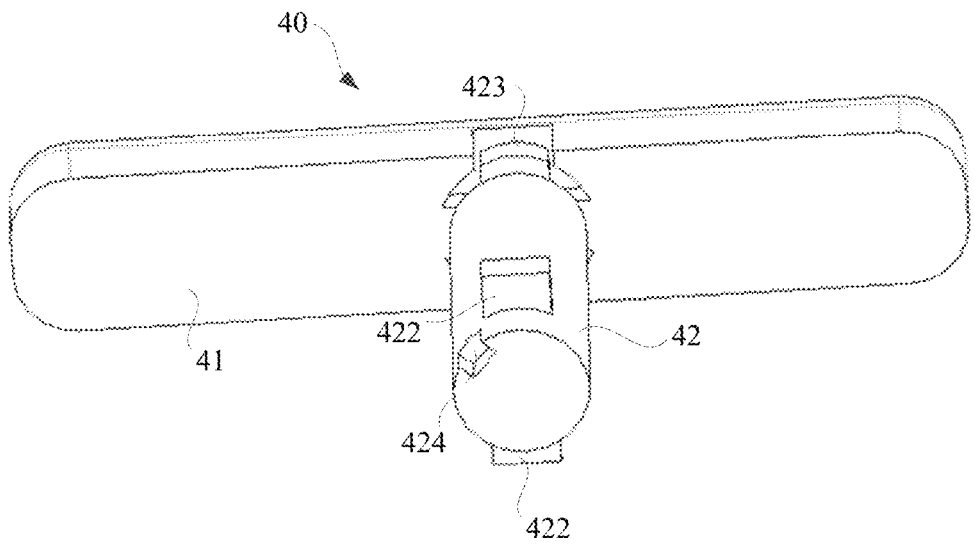
FIG. 26 is a schematic diagram 3 of a structure of a button assembly according to an embodiment of this application.
Figure 27:
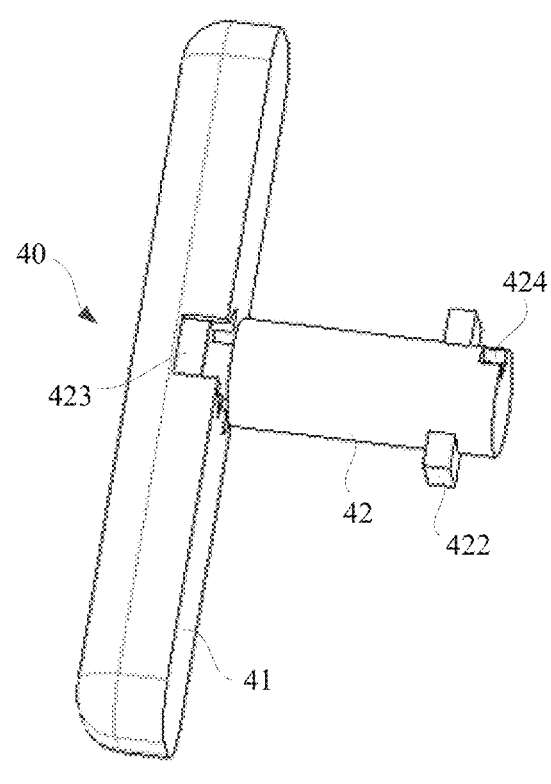
FIG. 27 is a schematic diagram 4 of a structure of a button assembly according to an embodiment of this application.

FIG. 26 and FIG. 27 are schematic diagrams of structures of another button assembly at a pre-assembly position and an assembly position.

In some embodiments, as shown in FIG. 26 and FIG. 27, an extension direction of a second assembly part 423 may also be parallel to the foregoing connection line. In this case, disposing positions of a limiting part 2235 and a via hole 2232 on a middle frame 20 are changed accordingly, to ensure an assembly of a button assembly 40 on the middle frame 20.

Therefore, in this embodiment, a trigger member 42 is stably connected to a button 41 and the middle frame 20 at the assembly position, to prevent the button assembly 40 from falling out of the middle frame 20. Therefore, a structure of the button assembly 40 is more diversified.

As shown in FIG. 26 and FIG. 27, a distance between a first assembly part 422 and the second assembly part 423 is greater than a thickness of a button slot 2231 at a bottom of a groove on a position that corresponds to the first assembly part 422, to ensure that when the trigger member 42 rotates in the via hole 2232 to the assembly position, the first assembly part 422 is engaged with an inner wall of the middle frame 20. In this way, after the trigger member 42 is connected to the button 41 through the second assembly part 423 in the via hole 2232, the first assembly part 422 may extend outside the via hole 2232. Therefore, the trigger member 42 may rotate to the assembly position by rotating the trigger member 42 in the via hole 2232 relative to the button 41 and the middle frame 20, and then may be engaged with the inner wall of the middle frame 20 through the first assembly part 422. This simplifies the assembly of the button assembly 40 on the middle frame 20, reduces an assembly risk of the button assembly 40, ensures hand feeling of a button of an electronic device, and achieves a purpose of preventing the button assembly 40 from falling out of the middle frame 20.

Figure 28:
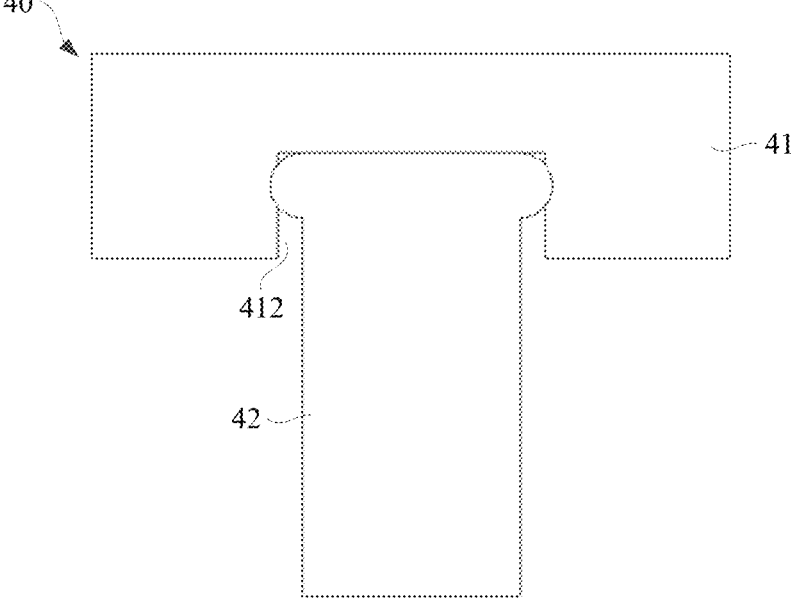
FIG. 28 is a schematic diagram 1 of an assembly structure of a trigger member and a button according to an embodiment of this application.
Figure 29:
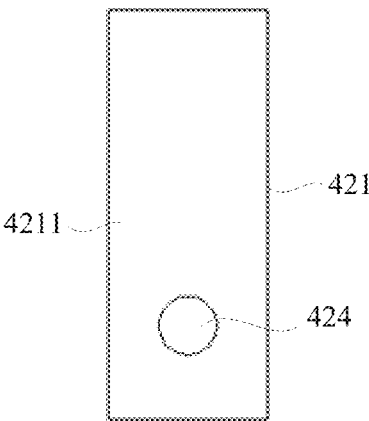
FIG. 29 is a schematic diagram 1 of a structure of a force application slot on a trigger member according to an embodiment of this application.
Figure 30:
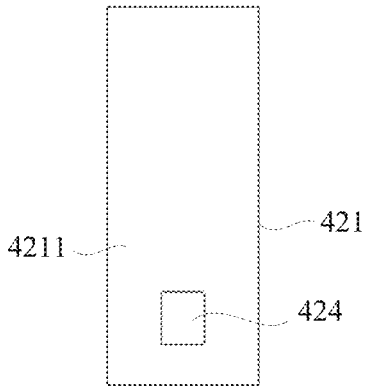
FIG. 30 is a schematic diagram 2 of a structure of a force application slot on a trigger member according to an embodiment of this application.
Figure 31:
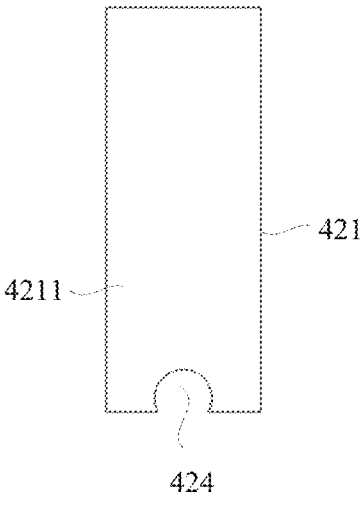
FIG. 31 is a schematic diagram 3 of a structure of a force application slot on a trigger member according to an embodiment of this application.
Figure 32:
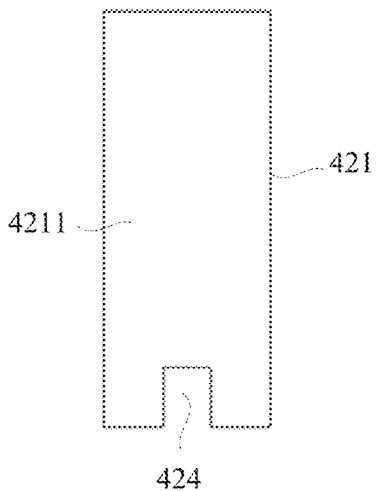
FIG. 32 is a schematic diagram 4 of a structure of a force application slot on a trigger member according to an embodiment of this application.
Figure 33:
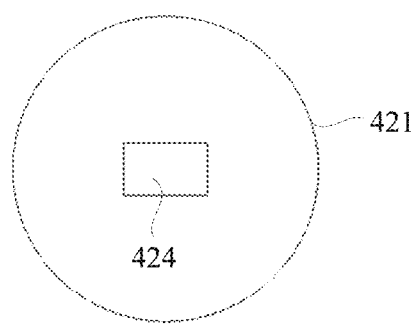
FIG. 33 is a schematic diagram 5 of a structure of a force application slot on a trigger member according to an embodiment of this application.

FIG. 28 is a schematic diagram 1 of an assembly structure of a trigger member and a button.

In some embodiments, as shown in FIG. 28, an end part of a trigger member 42 may also be threaded in an assembly cavity 412 and connected to a button 41 in an interference fit manner. To facilitate rotation of the trigger member 42, a material of the trigger member 42 may be properly adjusted, to rotate the trigger member 42 while the trigger member 42 is connected to the button 41 in the interference fit manner. In this way, while the trigger member 42 is connected to the button 41, structures of the trigger member 42 and the button 41 are further simplified.

FIG. 29 to FIG. 33 are schematic diagrams of structures of a force application slot on a trigger member.

To facilitate rotation of a trigger member 42 in a middle frame 20, as shown in FIG. 29 to FIG. 33, a force application slot 424 is formed on the trigger member 42, and the force application slot 424 is disposed at a second terminal of the trigger member 42. The force application slot 424 may be located at a second terminal of a trigger body 421. Before the trigger member 42 rotates to an assembly position, a button 41 may be pushed to enable the trigger member 42 to move toward an inner part of a mobile phone 100 along a width direction of an electronic device such as the mobile phone 100. This ensures that the force application slot 424 may be exposed on a surface of the middle frame 20. Therefore, an auxiliary tool such as a rotary rod may act in the force application slot 424, to drive the trigger member 42 to rotate to the assembly position relative to the middle frame 20 and the button 41. While a button assembly 40 is assembled on the middle frame 20, a difficulty of assembling the button assembly 40 on the middle frame 20 is reduced. Therefore, the button assembly 40 is easily assembled on the middle frame 20.

As shown in FIG. 29 to FIG. 33, the force application slot 424 may be disposed on a circumferential surface 4211 of the trigger body 421. Alternatively, the force application slot 424 may also be disposed on an end surface of the second terminal of the trigger body 421. For example, a shape of the force application slot 424 may be but is not limited to a circle, a square, or another shape. In this embodiment, the shape of the force application slot 424 and a disposing position of the force application slot 424 on the trigger body 421 are not further limited, provided that the force application slot 424 may match the auxiliary tool in a preset angle of the trigger member 42, to facilitate a rotation operation of the trigger member 42.

In some embodiments, another auxiliary tool such as a clamp or the like may also act on an end part of the trigger member 42, to drive the trigger member 42 to rotate relative to the middle frame 20 and the button 41. This reduces disposing of the force application slot 424.

Figure 34:
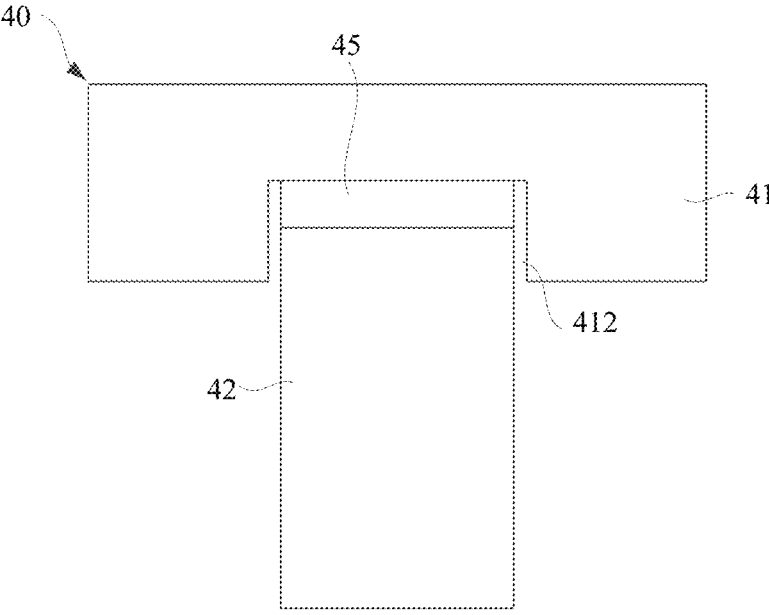
FIG. 34 is a schematic diagram 2 of an assembly structure of a trigger member and a button according to an embodiment of this application.

FIG. 34 is a schematic diagram 2 of an assembly structure of a trigger member and a button.

To ensure pressing feeling of a button assembly 40, as shown in FIG. 34, in some embodiments, the button assembly 40 may also include a buffer 45. The buffer 45 is disposed in an assembly cavity 412 of a button 41 and connected between a trigger member 42 and the button 41. For example, the buffer 45 may include but is not limited to foam or gum.

Figure 35:
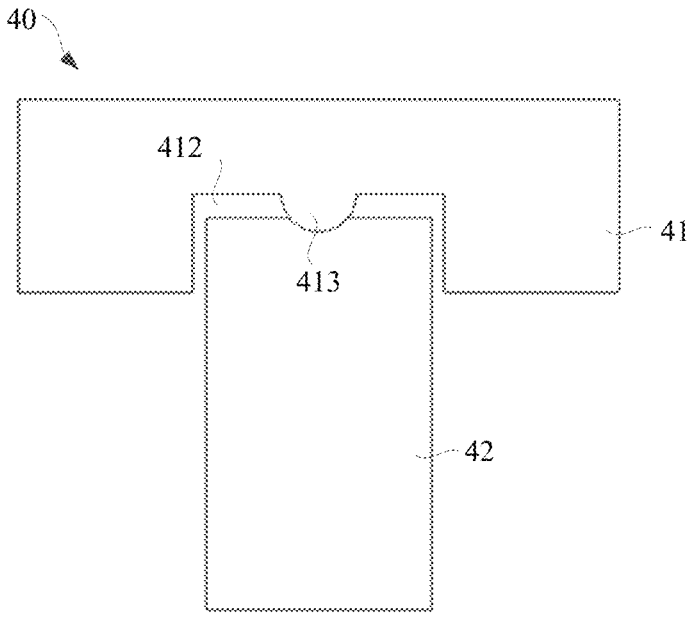
FIG. 35 is a schematic diagram 3 of an assembly structure of a trigger member and a button according to an embodiment of this application.
Figure 36:
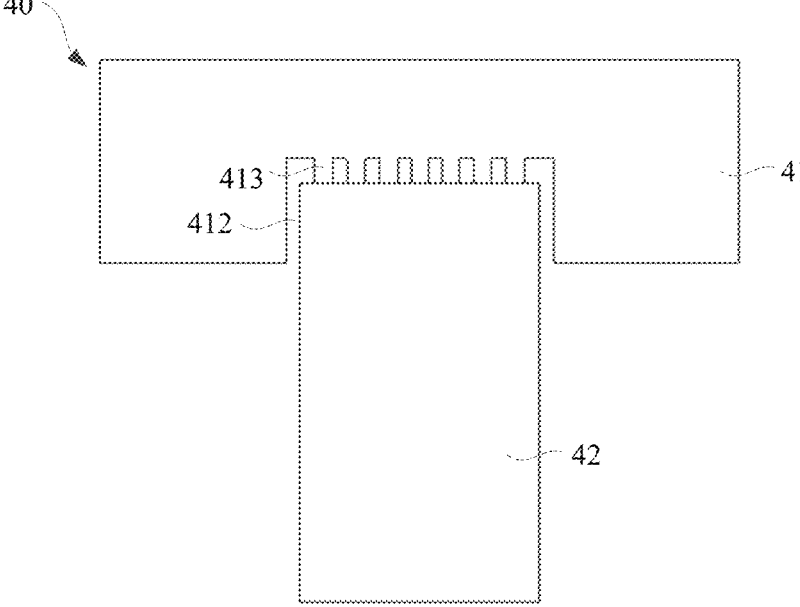
FIG. 36 is a schematic diagram 4 of an assembly structure of a trigger member and a button according to an embodiment of this application.

FIG. 35 and FIG. 36 are schematic diagrams 3 and 4 of an assembly structure of a trigger member and a button.

As shown in FIG. 35 and FIG. 36, in some embodiments, one or more supporting parts 413 may be disposed on an assembly cavity 412 of a button 41 of a button assembly 40, to replace a buffer 45, thereby ensuring pressing feeling of the button assembly 40. When a trigger member 42 is connected in the button 41, the supporting part 413 may be in contact with and squeeze an end part of the trigger member 42 (as shown in FIG. 35). Alternatively, the supporting part 413 may be directly attached to a first terminal of the trigger member 42 (as shown in FIG. 36). In some other embodiments, the supporting part 413 may also be disposed at the first terminal of the trigger member 42. In this way, while the pressing feeling of the button assembly 40 is ensured, a structure of the button assembly 40 is more diversified.

The button assembly 40 may be a power button or a volume button. To avoid linkage when the button assembly 40 is pressed, the volume button in this embodiment may include a volume up button and a volume down button that are independent of each other. The volume up button and the volume down button may be the button assembly 40 in this embodiment. To be specific, the button assembly 40 in this embodiment may include at least one of the power button, the volume up button, and the volume down button. In this way, linkage among the power button, the volume up button, and the volume down button and channeling problem of a button can be effectively avoided, and the power button, the volume up button, and the volume down button may be made of a same material, to enable the button assembly 40 to be one of the power button, the volume up button, and the volume down button. Therefore, the button assembly 40 can be more applicable and manufacturing costs of an electronic device can be effectively reduced. In addition, the button assembly 40 may not be reversely assembled on a middle frame 20, so that efficiency of assembling the button assembly 40 on the electronic device can be improved.

It should be noted that, when the volume up button and the volume down button each is one button assembly 40, the volume up button and the volume down button that are separated from each other may be formed on an outer surface of the electronic device such as a mobile phone. Alternatively, in some embodiments, a structure of the middle frame 20 may also be processed, for example, by embedding a metal member (not shown in the figures) with a same structure as that of the button assembly 40 on an outer wall of the middle frame 20. The metal member may be located on a side, facing the outer wall of the middle frame 20, of buttons 41 of the volume up button and the volume down button, and exposed on the outer surface of the electronic device. Therefore, a channeling problem of a button can be avoided, and a visual effect of the electronic device is integrated at the volume up button and the volume down button through the metal member.

In this embodiment of this application, by disposing the button assembly 40 in the electronic device, in the button assembly 40, the trigger member 42 is connected to both the button 41 and the middle frame 20 by one rotation. This ensures that the button 41 may be normally pressed and functions of the button of the electronic device may be enabled, to effectively prevent the button assembly 40 from falling out of the middle frame 20.

In the descriptions of embodiments of this application, it should be noted that unless otherwise specified or limited, terms "mount", "communicate", and "connect" shall be understood in a broad sense, for example, may be a fixed connection, may be an indirect connection by using an intermediate medium, or may be a connection between insides of two elements or an interaction relationship between two elements. A person of ordinary skill in the art can understand specific meanings of the foregoing terms in embodiments of this application based on a specific situation.

The terms "first", "second", "third", "fourth", and the like (if existent) in the specification, claims, and accompanying drawings of embodiments of this specification are used to distinguish between similar objects, but are not necessarily used to describe a particular order or sequence.

What is claimed is:

1. An electronic device, comprising:
   a button assembly, comprising a button and a trigger member; and
   a middle frame, wherein a button slot is disposed on an outer wall of the middle frame, and the button is disposed in the button slot, wherein
   a hole that passes through the outer wall and an inner wall of the middle frame is formed at a bottom of the button slot;

the trigger member passes through the hole, a first terminal of the trigger member is connected to the button, and a second terminal of the trigger member has a first assembly part;

the trigger member rotates in the hole to a pre-assembly position or an assembly position, when the trigger member rotates in the hole to the pre-assembly position, the trigger member passes through the hole, or when the trigger member rotates in the hole to the assembly position, the first assembly part abuts against the inner wall of the middle frame, to limit the trigger member to move toward the outer wall of the middle frame; and the button is configured to drive the trigger member to move toward a direction facing the inner wall of the middle frame, to trigger a conductive member in the electronic device;

the first terminal has a second assembly part, the button has an assembly cavity and an assembly hole through which the second assembly part passes, the assembly hole is connected to the assembly cavity, and the second assembly part is disposed in the assembly cavity through the assembly hole and engaged with the button, to limit the button to move toward the outer wall of the middle frame; and the first assembly part and the second assembly part are respectively disposed in different directions of the trigger member in a circumferential direction;

when the trigger member rotates in the hole to the assembly position, the second assembly part and the assembly hole are disposed in a staggered manner and engaged with a wall of the assembly cavity, to limit the button to move toward the outer wall of the middle frame; and when the trigger member rotates in the hole to the pre-assembly position, the second assembly part is axially aligned with the assembly hole, and the second assembly part passes through the assembly hole.

2. The electronic device according to claim 1, wherein when the trigger member rotates in the hole to the assembly position, the first assembly part is engaged with the inner wall of the middle frame, and the first terminal is engaged with the button, to limit the trigger member and the button to move toward the outer wall of the middle frame.

3. The electronic device according to claim 1, wherein two first assembly parts are disposed on the trigger member, an extending direction of the second assembly part is perpendicular to a connection line between the two first assembly parts, or an extending direction of the second assembly part is in parallel to a connection line between the two first assembly parts.

4. The electronic device according to claim 1, wherein a distance between the first assembly part and the second assembly part is greater than a bottom thickness of the button slot at a position corresponding to the first assembly part, to ensure that when the trigger member rotates in the hole to the assembly position, the first assembly part is engaged with the inner wall of the middle frame.

5. The electronic device according to claim 1, wherein a force application slot is formed on the trigger member, and the force application slot is disposed at the second terminal of the trigger member.

6. The electronic device according to claim 1, wherein the button assembly further comprises a buffer, the buffer is disposed in an assembly cavity of the button and connected between the trigger member and the button.

7. The electronic device according to claim 1, wherein the middle frame has a middle plate and a border frame, the border frame encloses a circumferential edge of the middle plate, the button assembly is disposed on the border frame, and the button assembly comprises at least one of a power button, a volume up button, and a volume down button.

8. The electronic device according to claim 1, wherein the electronic device further comprises a button circuit board, the conductive member is disposed on the button circuit board, the conductive member is disposed in the middle frame and abuts against the second terminal, and the trigger member is configured to move toward the direction facing the inner wall of the middle frame under drive of the button, to trigger an elastic deformation of a side, facing the button circuit board, of the conductive member, and conduct the conductive member with the button circuit board.

9. The electronic device according to claim 1, wherein a blocking part that extends toward a side of the assembly hole is disposed on the wall of the assembly cavity, and the blocking part is engaged with the second assembly part, to limit the button to move toward the outer wall of the middle frame.

10. The electronic device according to claim 9, wherein the second assembly part is disposed on an end surface of the first terminal, a rotating groove is formed on a circumferential surface of the trigger member, and at least a part of a structure of the blocking part is disposed in the rotating groove and is engaged with the second assembly part, to limit the button to move toward the outer wall of the middle frame.

11. The electronic device according to claim 10, wherein the second assembly part is an assembly block on the end surface of the first terminal, and the assembly block is a strip block that extends along a length direction of the electronic device.

12. The electronic device according to claim 1, wherein the trigger member further comprises a trigger body, the trigger body extends in a radial direction of the hole, the trigger body has the second terminal, and the first assembly part projects from a side wall of the trigger body; and a shape of a cross section of the hole matches a shape of the trigger body and a shape of the first assembly part, and when the trigger member rotates in the hole to the pre-assembly position, the trigger body and the first assembly part pass through the hole, or when the trigger member rotates in the hole to the assembly position, the first assembly part abuts against the inner wall of the middle frame, to limit the trigger member to move toward the outer wall of the middle frame.

13. The electronic device according to claim 12, wherein the hole comprises a first through hole and a second through hole that are connected to each other, a shape of a cross section of the first through hole is adapted to the shape of a cross section of the trigger body, and a shape of a cross section of the second through hole is adapted to a shape of a cross section of the first assembly part.

14. The electronic device according to claim 13, wherein the inner wall of the middle frame has a limiting part, the limiting part is disposed on a side of the hole, and when the trigger member rotates in the hole to the assembly position, the first assembly part abuts against the limiting part, to limit the trigger member to rotate.

15. The electronic device according to claim 14, wherein at least two first assembly parts are disposed on the trigger member, the two the first assembly parts are spaced apart from each other around the hole, a quantity of limiting parts equals a quantity of first assembly parts, and the limiting parts are in a one-to-one correspondence with the first assembly parts.

16. The electronic device according to claim 14, wherein the limiting part is a groove that is disposed on the middle frame and adapted to a structure of the first assembly part, the groove is connected to a side wall of the hole, and when the trigger member rotates in the hole to the assembly position, the first assembly part is disposed in the groove and abuts against at least a part of a wall of the groove.

17. The electronic device according to claim 16, wherein the first assembly part is a boss on the trigger body, and the boss is a strip block whose end part extends along an axial direction perpendicular to the hole.

* * * * *